(12) United States Patent
Kuroda

(10) Patent No.: US 9,092,234 B2
(45) Date of Patent: Jul. 28, 2015

(54) REFACTORING DEVICE, REFACTORING METHOD AND PROGRAM

(75) Inventor: Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/000,240

(22) PCT Filed: Feb. 9, 2012

(86) PCT No.: PCT/JP2012/053589
§ 371 (c)(1),
(2), (4) Date: Aug. 19, 2013

(87) PCT Pub. No.: WO2012/111725
PCT Pub. Date: Aug. 23, 2012

(65) Prior Publication Data
US 2013/0332722 A1    Dec. 12, 2013

(30) Foreign Application Priority Data
Feb. 18, 2011   (JP) .................................. 2011-033166

(51) Int. Cl.
*G06F 9/44* (2006.01)

(52) U.S. Cl.
CPC ................ *G06F 9/4421* (2013.01); *G06F 8/72* (2013.01); *G06F 8/34* (2013.01)

(58) Field of Classification Search
None
See application file for complete search history.

(56) References Cited

U.S. PATENT DOCUMENTS

| | | | | |
|---|---|---|---|---|
| 6,633,888 B1 * | 10/2003 | Kobayashi | ............................ | 1/1 |
| 8,225,282 B1 * | 7/2012 | Massoudi et al. | ............. | 717/121 |
| 8,312,425 B2 * | 11/2012 | Hepper et al. | ................ | 717/107 |
| 8,407,724 B2 * | 3/2013 | Niazi | ............................. | 719/316 |
| 8,762,933 B2 * | 6/2014 | Balko et al. | .................... | 717/104 |
| 2006/0236281 A1 | 10/2006 | Furukawa | | |
| 2009/0138795 A1 * | 5/2009 | Liu et al. | ........................ | 715/234 |
| 2010/0064277 A1 * | 3/2010 | Baird et al. | ................... | 717/120 |
| 2010/0125824 A1 | 5/2010 | Kobayashi et al. | | |

(Continued)

FOREIGN PATENT DOCUMENTS

| | | |
|---|---|---|
| JP | 2005-149295 A | 6/2005 |
| JP | 2006-260288 A | 9/2006 |

(Continued)

OTHER PUBLICATIONS

Tibco ActiveMatrix Composite Editor User's Guide, Software Release 2.2, Mar. 2009, 201 pages, [retrieved on Oct. 2, 2014], Retrieved from the Internet: <URL:https://docs.tibco.com/pub/activematrix_service_bus/2.2.0_march_2009/amsb/pdf/tib_amx_composite_editor_users_guide.pdf>.*

(Continued)

*Primary Examiner* — Thuy Dao
*Assistant Examiner* — Geoffrey St Leger
(74) *Attorney, Agent, or Firm* — Sughrue Mion, PLLC

(57) ABSTRACT

In a method for obtaining a system by combining program components, the relocation of the program components can be facilitated. When a component has been moved between upper and lower level composites by a relocation processing unit, if a move source composite has a wiring between an element and a component to be moved, a complement processing unit performs complement processing in which a service or a reference is added to the lower level composite, a wiring for connecting the added service or reference and the element is set to the move source composite, and a wiring for connecting the added service or reference and the component to be moved is set to a move destination composite.

10 Claims, 33 Drawing Sheets

(56) References Cited

U.S. PATENT DOCUMENTS

2010/0306740 A1* 12/2010 Kent et al. ................ 717/117
2011/0154372 A1*  6/2011 Niazi ........................ 719/320
2012/0072884 A1*  3/2012 Balko et al. ............... 717/104
2012/0174058 A1*  7/2012 Winkler et al. ............ 717/105

FOREIGN PATENT DOCUMENTS

JP   2007-122187 A   5/2007
WO  2009/011056 A1   1/2009

OTHER PUBLICATIONS

Fernández, R., et al., Towards a user-centered composition system for service-based composite applications, Proceedings of the 11th International Conference on Information Integration and Web-based Applications & Services, 2009, pp. 321-330, [retrieved on May 9, 2015], Retrieved from the Internet: <URL:http://dl.acm.org/>.*
Chao M. Beck, et al., "Exploring the WebSphere Application Server Feature Pack for SCA, Part 1: An overview of the Service Component Architecture feature pack", developer Works, IBM Corporation, <URL:http://www.ibm.com/developerworks/websphere/library/techarticles/0812_beck/0812_beck.html>, pp. 1-7, Dec. 18, 2008.

* cited by examiner

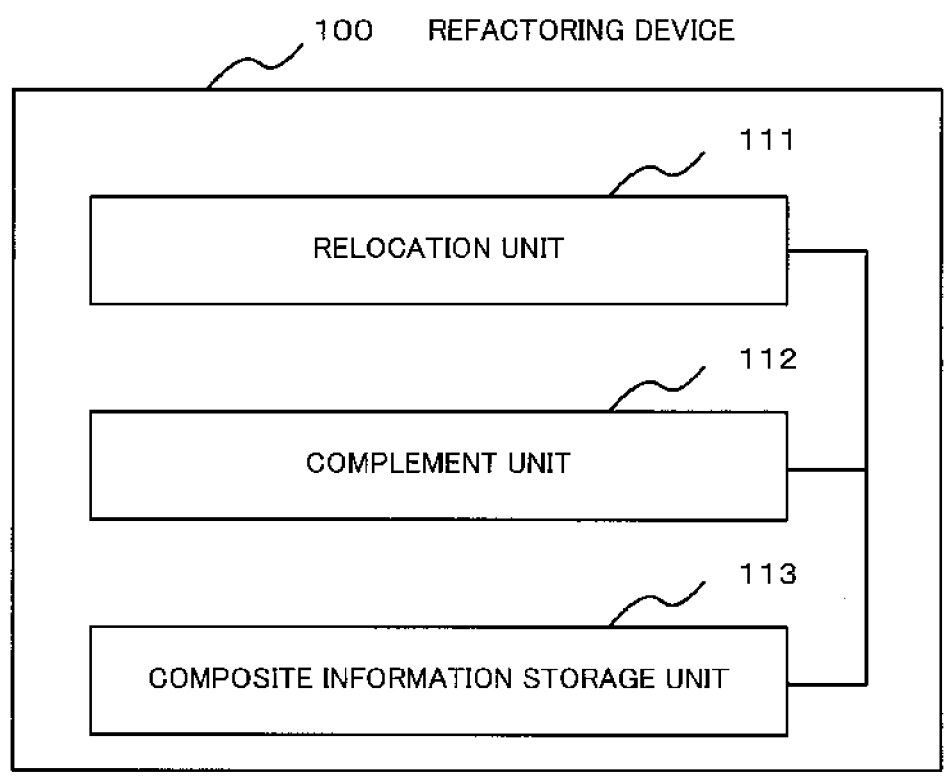

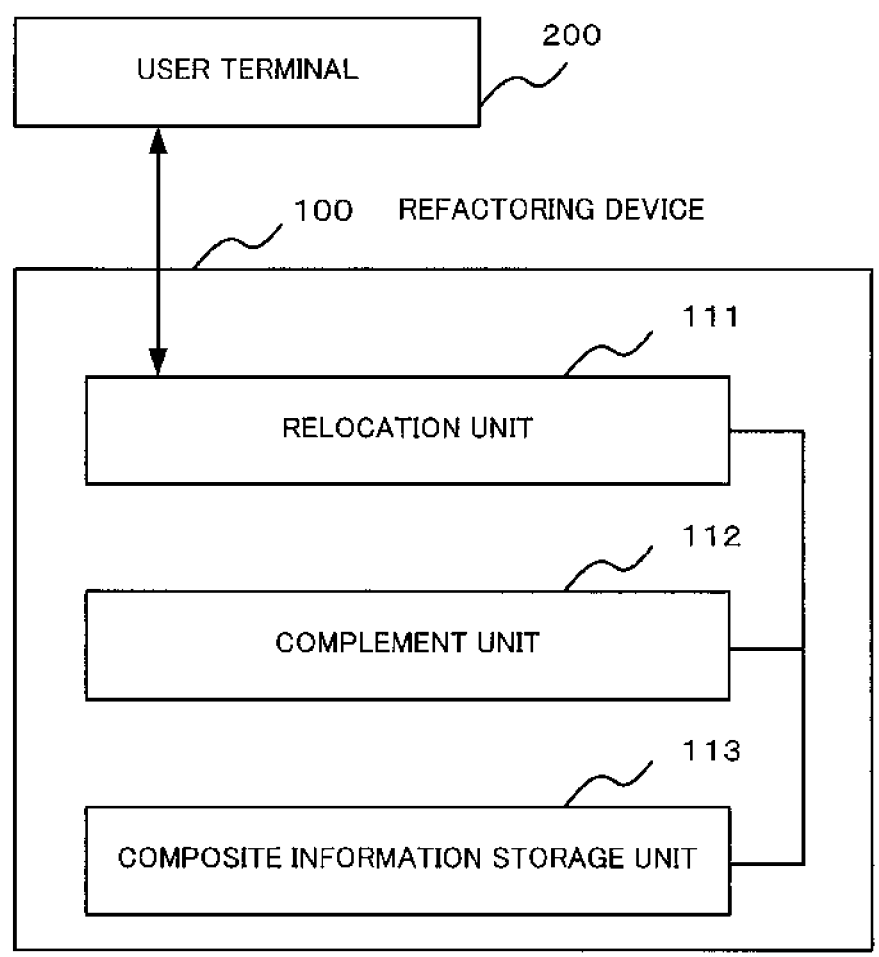

Fig.3

```
<composite name="C">
  <service name="S-C" />
  <reference name="R-C" />
  <property name="P-C" type="string">sample value</property>
  <component name="C-C_JC">
     <implement.java class="JC" />
     <property name="P-JC" source="P_C"/>
  </component>
  <wire source="S-C" target="C-C_JC/S-JC" />
  <wire source="C-C_JC/R-JC" target="R-C" />
  ...
</composite>
```

Fig.4

```
<composite name="P">
  <service name="S-P" />
  <component name="C1-P_C">
     <implement.composite name="C" />
     <property name="P-C">overwriting value</property>
  </component>
  <component name="C2-P_O">
     <implement.composite name="O" />
  </component>
  <wire source="C1-P_C/R-C" target="C2-P_O/S-O" />
  <wire source="S-P" target="C1-P_C/S-C" />
  ...
</composite>
```

Fig. 11
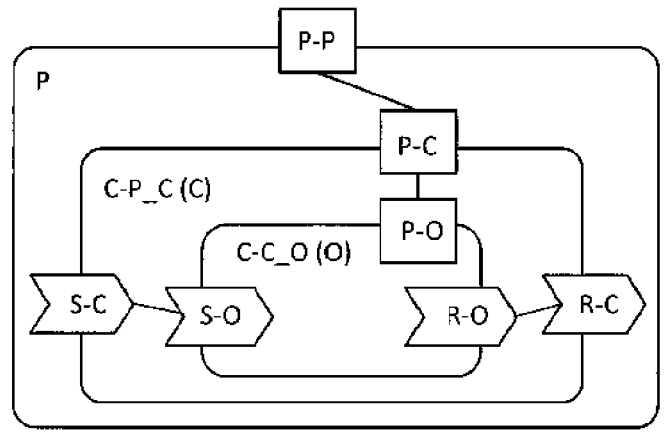
(a) BEFORE RELOCATION
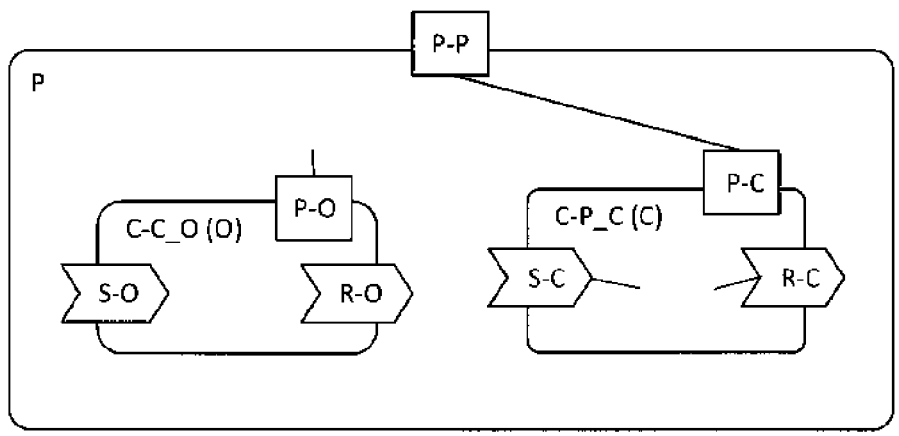
(b) AFTER RELOCATION
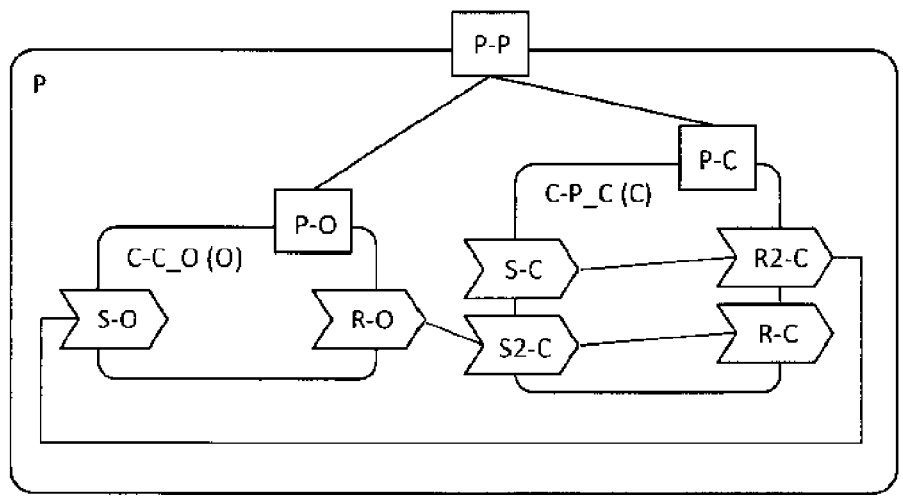
(c) AFTER COMPLEMENT PROCESSING Fig.13
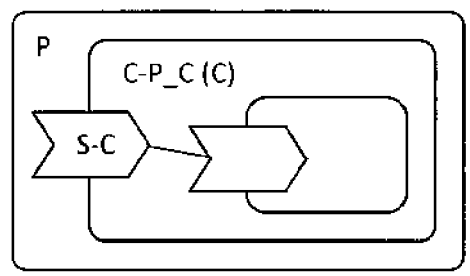
(a) BEFORE RELOCATION
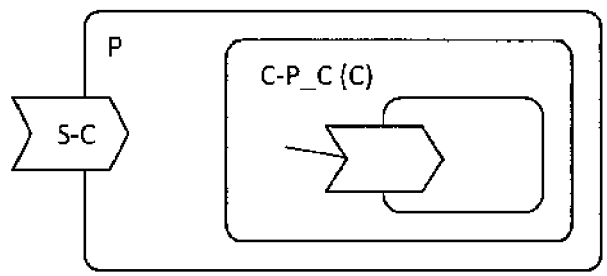
(b) AFTER RELOCATION
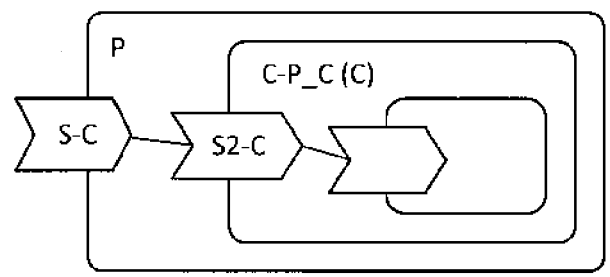
(c) AFTER COMPLEMENT PROCESSING Fig.15
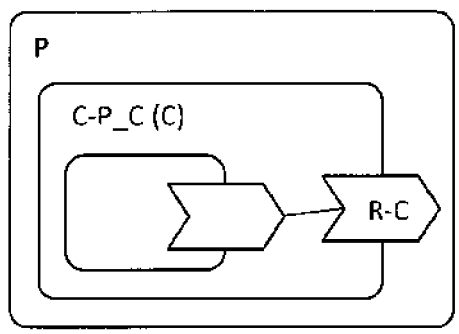
(a) BEFORE RELOCATION
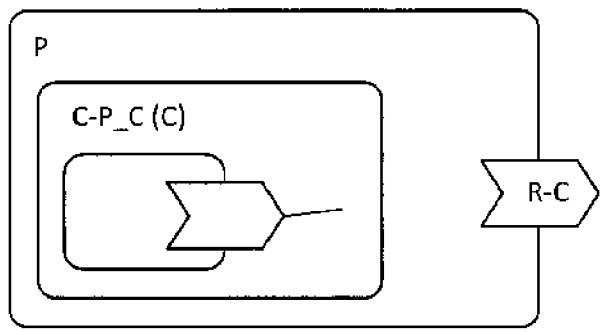
(b) AFTER RELOCATION
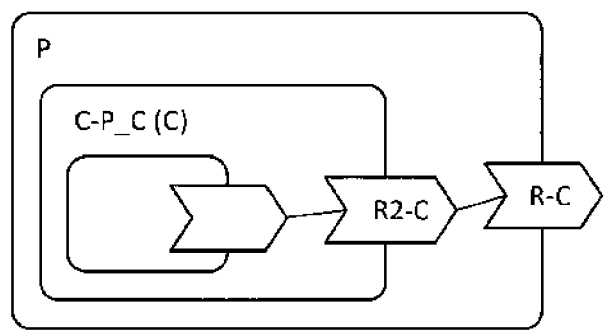
(c) AFTER COMPLEMENT PROCESSING Fig.17
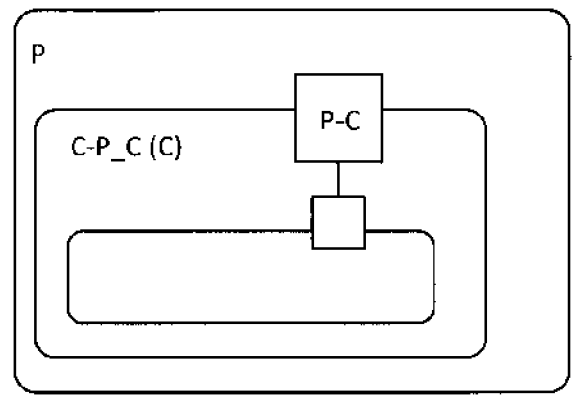
(a) BEFORE RELOCATION
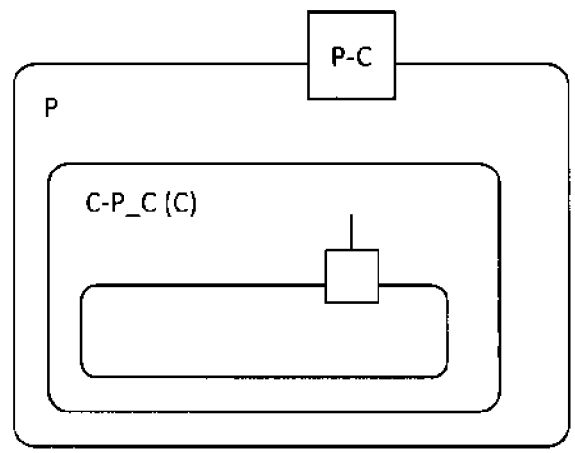
(b) AFTER RELOCATION
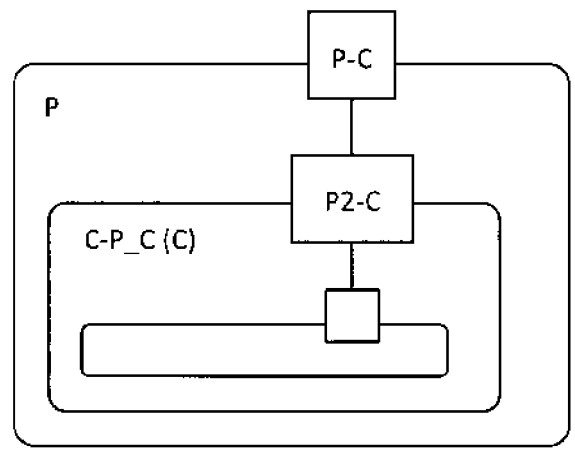
(c) AFTER COMPLEMENT PROCESSING Fig. 19
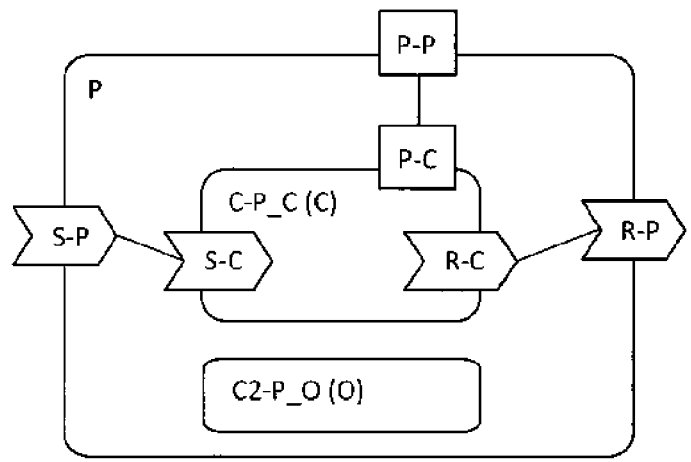
(a) BEFORE RELOCATION
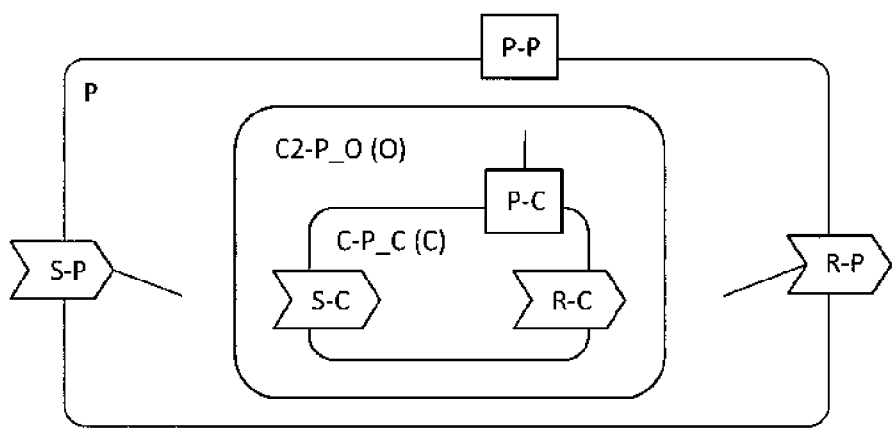
(b) AFTER RELOCATION
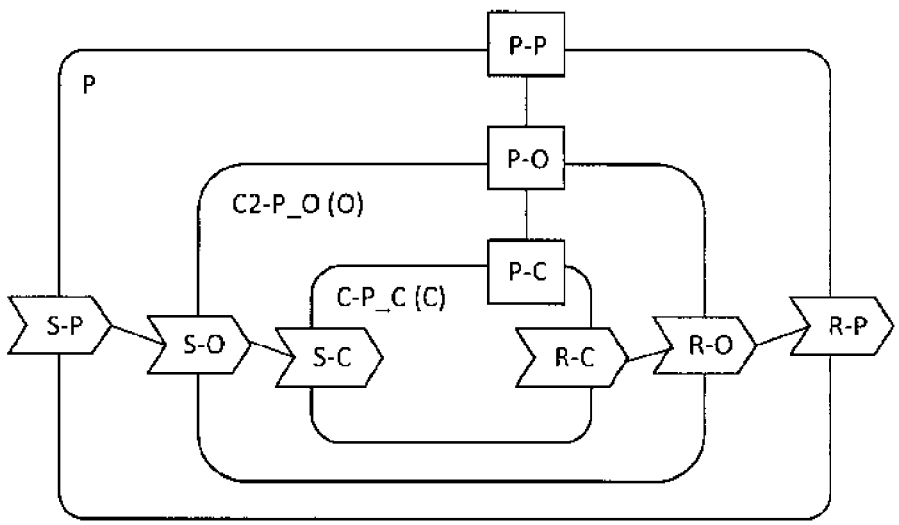
(c) AFTER COMPLEMENT PROCESSING

Fig.21

| COMPOSITE NAME | ELEMENT CLASS | ELEMENT ID |
|---|---|---|
| C | service | S-C |
| P | wire | S-P:C-P_C/S-C |

Fig.25
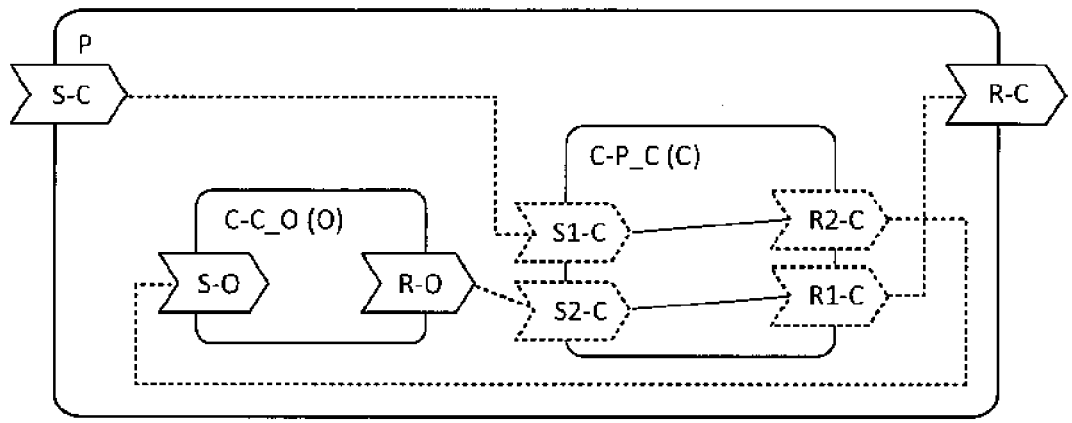
(a) AFTER COMPLEMENT PROCESSING
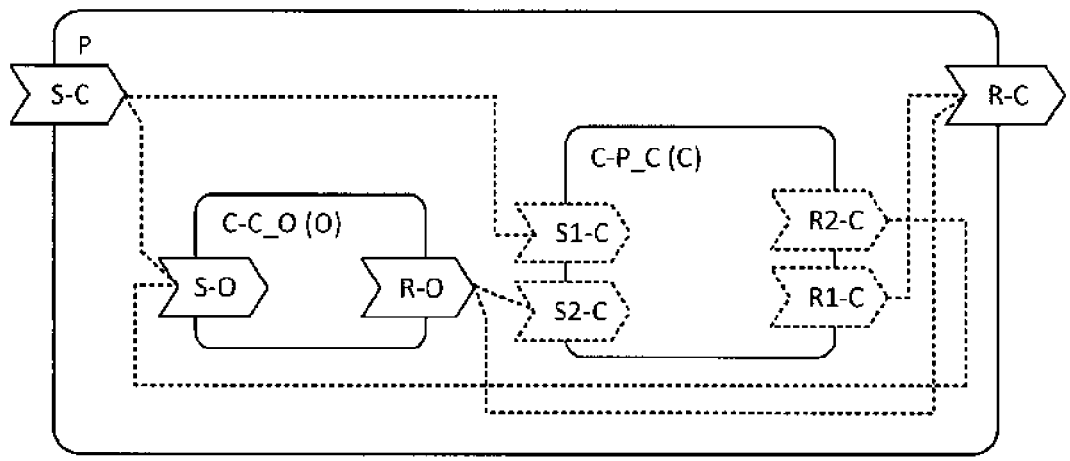
(b) IN MODIFICATION PROCESSING
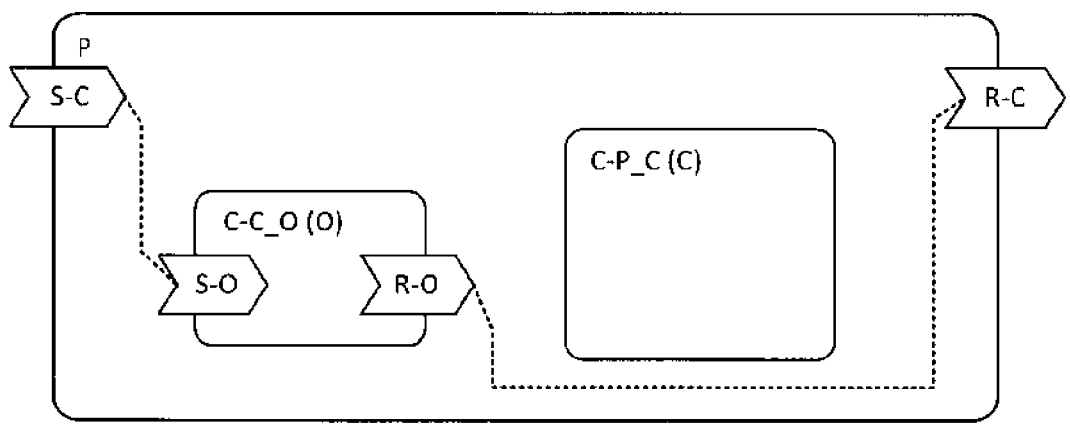
(c) AFTER MODIFICATION PROCESSING Fig.26
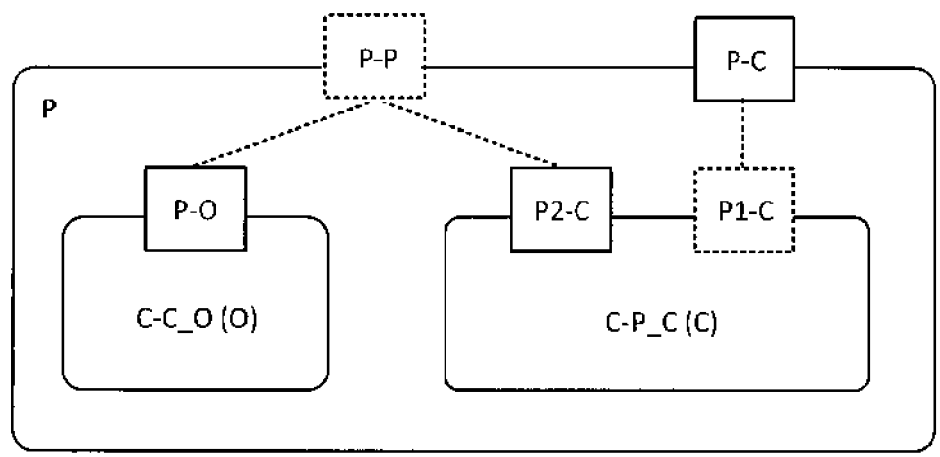
(a) AFTER COMPLEMENT PROCESSING
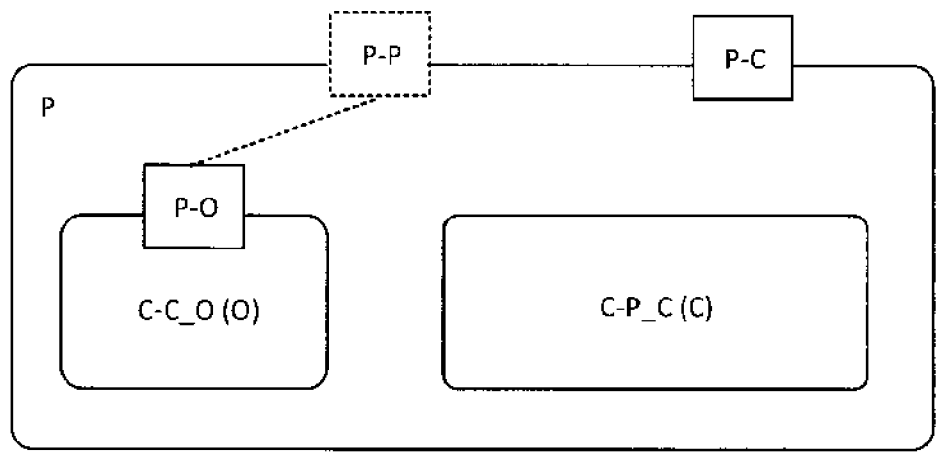
(b) AFTER MODIFICATION PROCESSING Fig.28
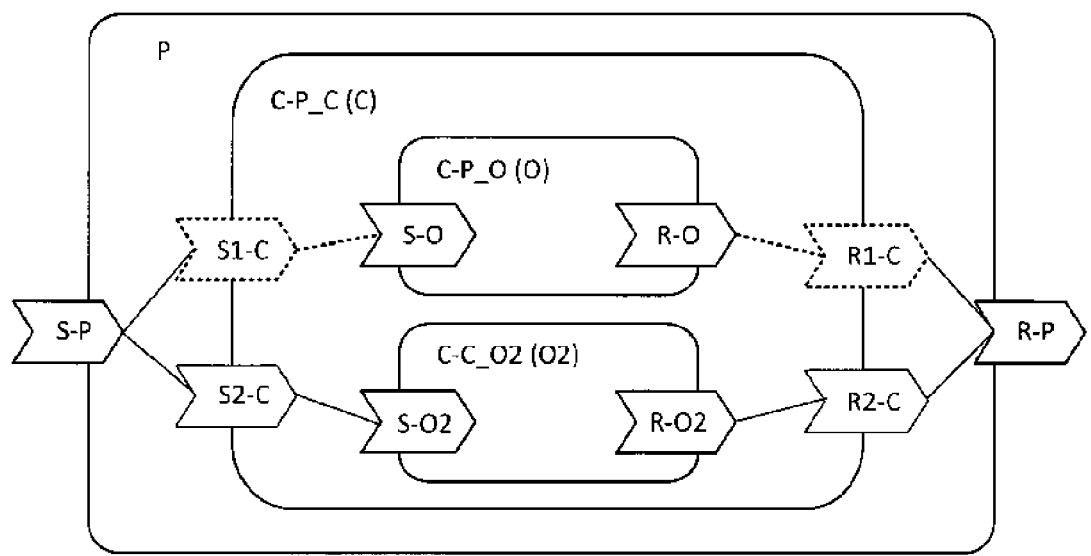
(a) AFTER COMPLEMENT PROCESSING
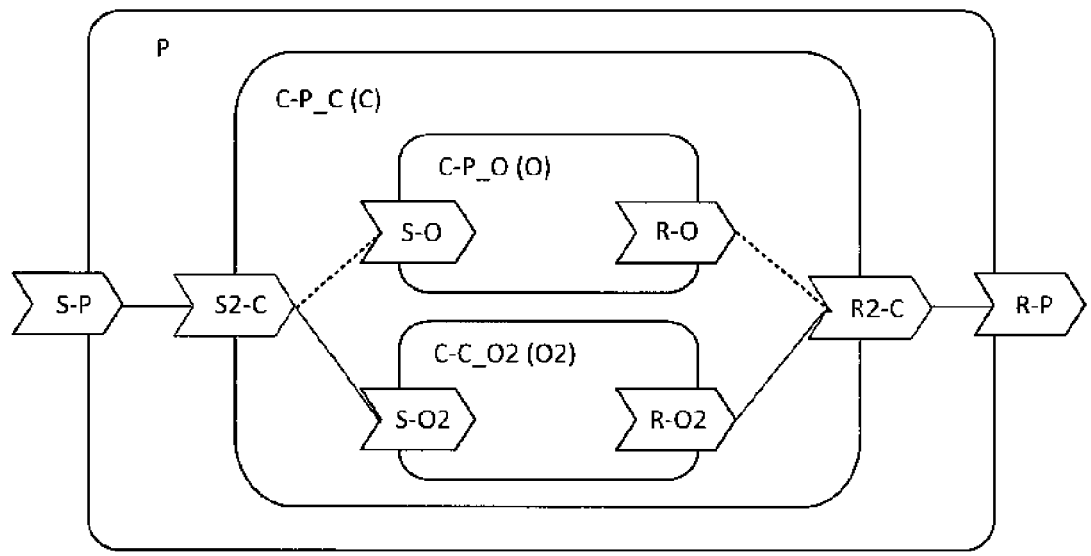
(b) AFTER MODIFICATION PROCESSING Fig.29
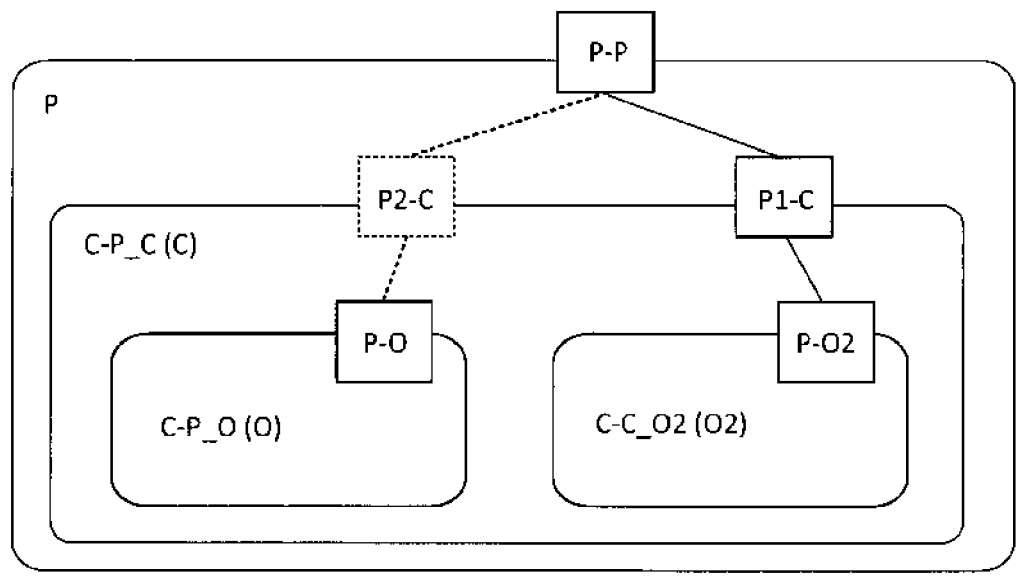
(a) AFTER COMPLEMENT PROCESSING
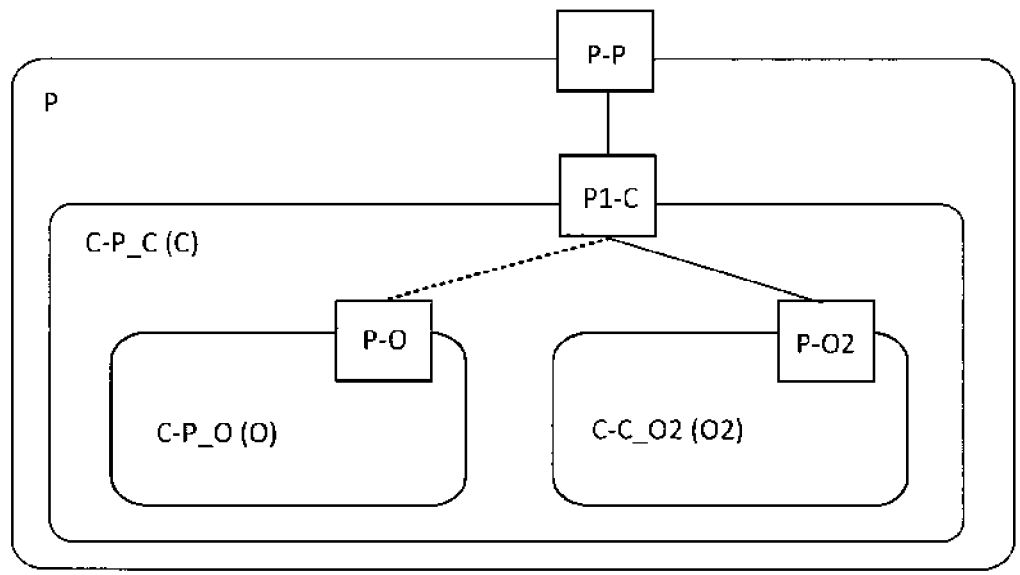
(b) AFTER MODIFICATION PROCESSING Fig.31
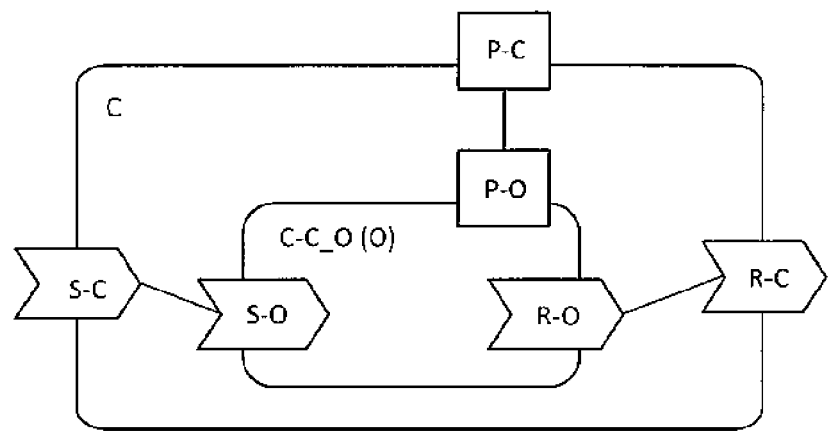
(a) BEFORE ENCAPSULATION PROCESSING
ENCAPSULATE  EXPAND
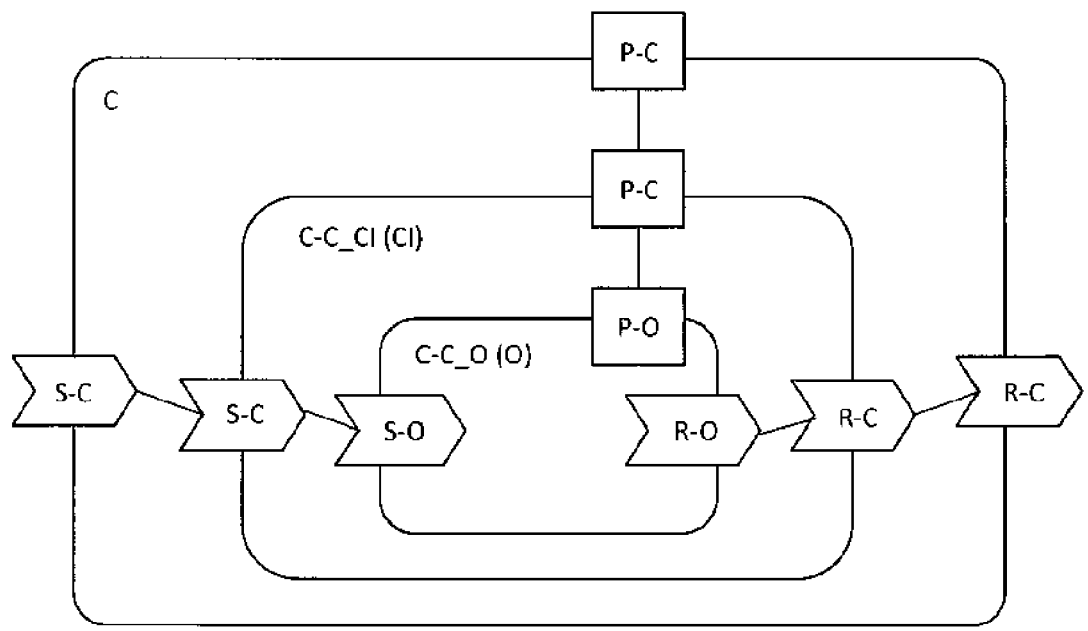
(b) AFTER ENCAPSULATION PROCESSING Fig. 34
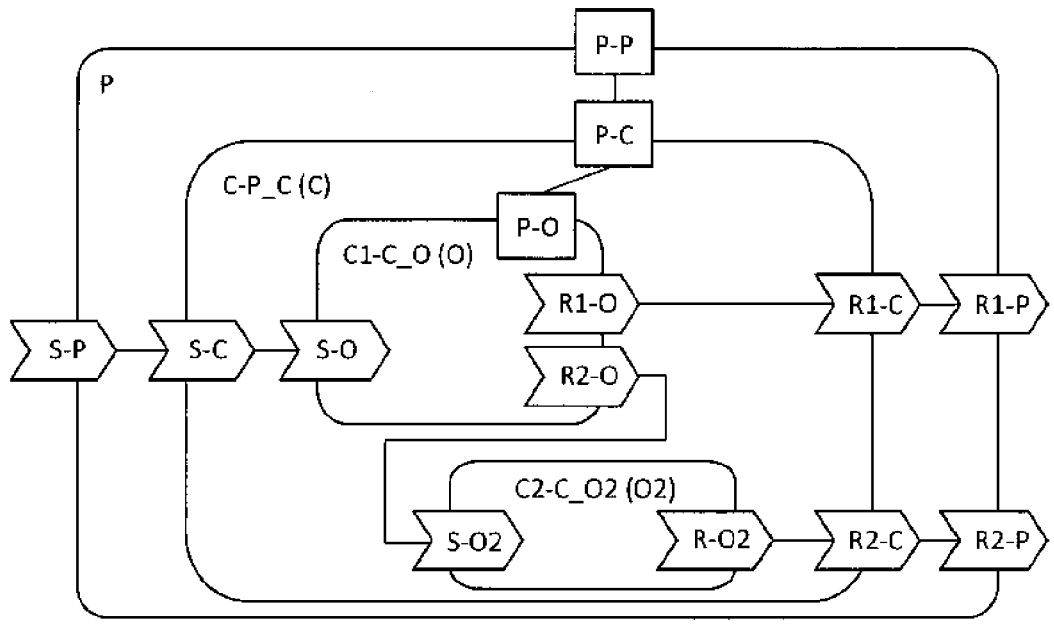
(a) BEFORE EXPAND PROCESSING
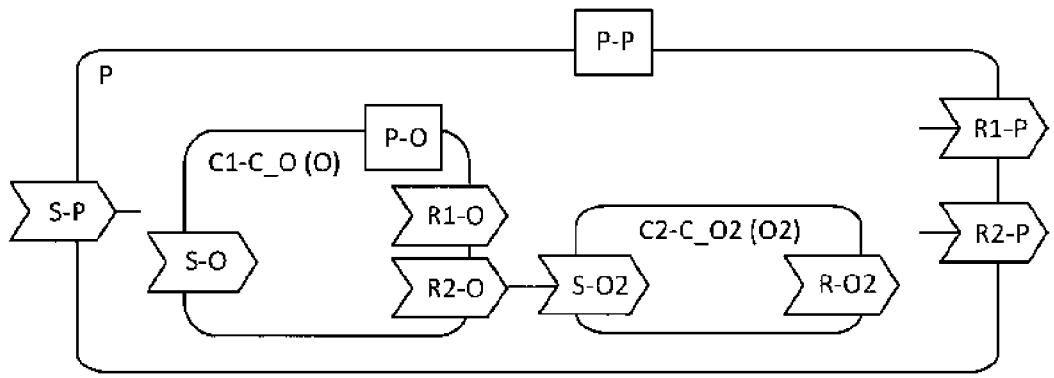
(b) IN EXPAND PROCESSING
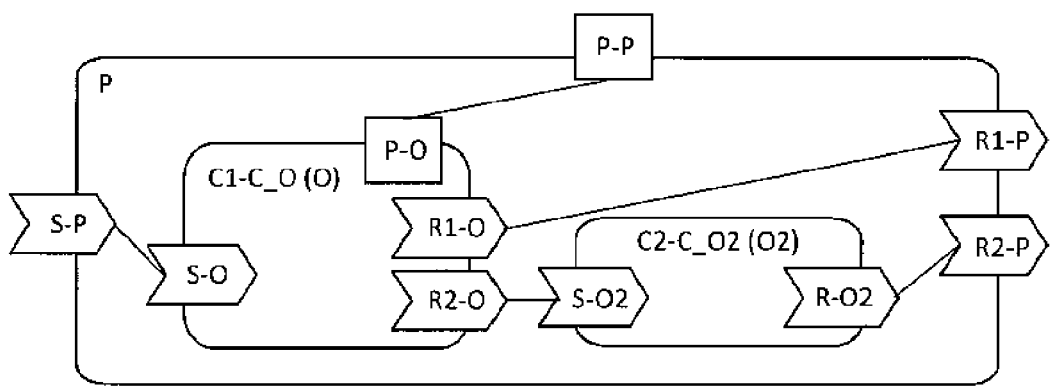
(c) AFTER EXPAND PROCESSING

REFACTORING DEVICE, REFACTORING METHOD AND PROGRAM

CROSS REFERENCE TO RELATED APPLICATIONS

This application is a National Stage of International Application No. PCT/JP2012/053589 filed Feb. 9, 2012, claiming priority based on Japanese Patent Application No. 2011-033166 filed Feb. 18, 2011, the contents of all of which are incorporated herein by reference in their entirety.

TECHNICAL FIELD

The present invention relates to a refactoring device, a refactoring method, and a program and in particular, relates to a refactoring device, a refactoring method, and a program for relocating program components of a system.

BACKGROUND ART

In recent years, a design concept of software called service oriented architecture (SOA) is drawing attention with progress of distributed computing technology. In SOA, program components, each providing a bundle of general functions, are operated independently. The functions are presented outside as a service. A target system is built with these services cooperating with each other. The cooperation between the program components is specified simply with an interface of the service provided by each program component. Therefore, independence, maintainability, and reusability of each program component are improved.

As a concrete method for obtaining software according to the concept of SOA, service component architecture (SCA) is known.

SCA is the method for obtaining software in which a system is built focusing on a component (or component element) which is an instance of a program component and a service (or service element) which is a function provided by the component. As other elements than a component and a service, a reference (or reference element), a wiring (or wiring element), a property (or property element) and a composite (or composite element) or the like are also used.

The detailed specification of SCA is described in non-patent literature 1, for example.

Here, taking SCA as an example, a specification of such program modularization which has high reusability in a method for obtaining a system by combination of program components will be described.

FIG. 35 is a diagram showing elements defined in SCA.

In FIG. 35, a component 301 is an element that specifies an instance of an executable program component. The component 301 includes implementation of a program component and setting required for the execution thereof. For example, the implementation is specified by a program described using a language such as Java (registered trademark) or C++, and the setting is specified by an element such as a service 302, a reference 303, and a property 304 of the component 301. Here, the service 302 is an element that specifies a function provided by the component 301. The reference 303 is an element that specifies the service consumed by the component 301. The property 304 is an element that specifies a variable and a value thereof used by the component 301 when it is executed.

A composite 310 is an element that specifies a combination of these elements. The composite 310 may include a plurality of components 301 and wirings 315, 316 in the interior thereof. The wirings 315, 316 are elements that specify a connection between an element requiring a service and an element providing the service. Cooperation among a plurality of program components, which are the characteristics of SOA, is expressed by connecting the reference 303 and the service 302 with a wiring between components 301.

The composite 310 itself may be reused for an implementation of other components (the composite 310 can use an instance of other composite 310 as a component).

The composite 310 may include a service 312 in the interior thereof. By doing this, it is possible to specify a service that can be provided when the composite 310 is instantiated as a component. The service 312 included in the composite is provided by the service 302 of the component 301 included in the composite 310. These services 302 and 312 are connected by the wiring 315 in the composite 310.

The composite 310 may include a reference 313 in the interior thereof. By doing this, it is possible to specify a service consumed when the composite 310 is instantiated as a component. The reference 313 is used when the service consumed by the component 301 included in the composite 310 is provided outside the composite 310. In this case, the reference 303 of the component 301 that consumes the service and the reference 313 of the composite 310 are connected by the wiring 316 in the composite 310.

An interface may be specified for the service 312 and the reference 313 of the composite 310. By doing this, it is possible to control application of the wiring, considering functionality that can be provided by the service 312 and functionality required by the reference 313.

The composite 310 may include a property 314 in the interior thereof. By doing this, it is possible to specify a property that can indicate a value when the composite is instantiated as a component. The property 314 included in the composite can be referred from the component 301 as a value of the property 304 of the component 301 included in the composite 310. By doing this, it is possible to set a value of the property 314 of the component 301 included in the composite 310 on a component using the composite 310 as an implementation. A type of a value may be specified for the property 314. By doing this, it is possible to control reference setting is permitted or not, considering compatibility between the type of a value required by the referring property and the type of a value provided by the referred propriety.

The mechanism to inject a function or data on which a program component depends from the outside, such as the mechanism of a reference or referring to a property described above, is generally called dependency injection (DI). The dependency injection is drawing attention as a method for improving a reusability of a program component, particularly in recent years.

In the method for obtaining a system by combination of program components such as SCA, the target system can be effectively built, based on many general and fine-grained program components, by gathering components or services as composites and further gathering the composites as higher order composites, using the mechanism of DI.

By the way, in the method for obtaining a system by the combination of program components, generally, the necessary elements are not always stored in the suitable composite from the beginning of the design. It is necessary to perform refactoring and to adjust locations of the elements included in a program component as same as other programming methods.

For example, a composite A that provides a service receiving two integers and displaying the sum of them with easily viewable format to a user is considered. The composite A has a component S that calculates the sum and a component P that displays it with easily viewable format to the user. Here, it is found that a similar function can be provided for other calculations by changing the component S into another component, for example, a component M for multiplication. In this case, the reusability of the composite A can be improved by extracting a part that uses the service of the component S in the composite A as a reference and changing the composite A into a composite that displays a calculated result with easily viewable format in combination with an arbitrary calculation component.

However, in case the composite including the component to be relocated is already used as an implementation of a component in other composite, or in case the component to be relocated is connected with other services or references, the user needs to perform adjustments of elements other than the component to be relocated, such as adding a component and adding a wiring for connecting the added component, so that the refactoring does not affect the functionality of the whole system.

Note that, in patent literature 1, as a related art in a technology regarding the refactoring support in system development using the combination of program components, a method removing a code of a function that is not used is described.

CITATION LIST

Patent Literature

[Patent literature 1] Japanese Patent Application Laid-Open No. 2007-122187

Non-Patent Literature

[Non-patent literature 1] SCA Service Component Architecture, Assembly Model Specification, SCA Version 1.00, Mar. 15, 2007, http://osoa.org/download/attachments/35/SCA_AssemblyModel_V100.pdf? version=1

SUMMARY OF INVENTION

Technical Problem

As mentioned above, in the method for obtaining a system by the combination of program components, when relocating program components in refactoring, a user needs to modify definitions of the program components in order to maintain functionality of the whole program. Particularly, when the program component to be relocated is intricately related to other program components, many complicated modifications are required. It causes a problem that a work cost of refactoring is increased and a possibility of performing mis-modification is increased.

An object of the present invention is to solve the problem mentioned above, and to provide a refactoring device to facilitate relocation of the program components in a method for obtaining a system by combining program components.

Solution to Problem

A refactoring device according to an exemplary aspect of the invention includes: a composite information storage means for storing a plurality of composites each including, as an element, a component which defines predetermined processing or a use of an instance of other composite, a service which defines a function provided, a reference which defines a function used, and a wiring which defines a function providing relation among a component, a service, and a reference; a relocation means for moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and a complement means for performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

A refactoring method according to an exemplary aspect of the invention includes: storing a plurality of composites each including, as an element, a component which defines predetermined processing or a use of an instance of other composite, a service which defines a function provided, a reference which defines a function used, and a wiring which defines a function providing relation among a component, a service, and a reference; moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

A computer readable storage medium according to an exemplary aspect of the invention, records thereon a program, causing a computer to perform a method including: storing a plurality of composites each including, as an element, a component which defines predetermined processing or a use of an instance of other composite, a service which defines a function provided, a reference which defines a function used, and a wiring which defines a function providing relation among a component, a service, and a reference; moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

Advantageous Effect of the Invention

An advantageous effect of the present invention is that it is possible to facilitate relocation of the program components in a method for obtaining a system by combining program components.

BRIEF DESCRIPTION OF DRAWINGS

FIG. 1 A block diagram showing a characteristic configuration of a first exemplary embodiment of the present invention.

FIG. 2 A block diagram showing a configuration of a refactoring system to which a refactoring device 100 according to the first exemplary embodiment of the present invention is applied.

FIG. 3 A diagram showing a description example of composite definition information with an XML format.

FIG. 4 A diagram showing another description example of the composite definition information with an XML format.

FIG. 11 A diagram showing an example of composite definition information regarding relocation of a component element to an upper level composite according to the first exemplary embodiment of the present invention.

FIG. 13 A diagram showing an example of composite definition information regarding relocation of a service element to an upper level composite according to the first exemplary embodiment of the present invention.

FIG. 15 A diagram showing an example of composite definition information regarding relocation of a reference element to an upper level composite according to the first exemplary embodiment of the present invention.

FIG. 17 A diagram showing an example of composite definition information regarding relocation of a property element to an upper level composite according to the first exemplary embodiment of the present invention.

FIG. 19 A diagram showing an example of composite definition information regarding relocation of a component element to a lower level composite according to the first exemplary embodiment of the present invention.

FIG. 21 A diagram showing an example of complement information according to the second exemplary embodiment of the present invention.

FIG. 25 A diagram showing an example of composite definition information regarding relocation of an element (other than a property element) to an upper level composite according to the second exemplary embodiment of the present invention.

FIG. 26 A diagram showing an example of composite definition information regarding relocation of an element (a property element) to an upper level composite according to the second exemplary embodiment of the present invention.

FIG. 28 A diagram showing an example of composite definition information regarding relocation of an element (other than a property element) to a lower level composite according to the second exemplary embodiment of the present invention.

FIG. 29 A diagram showing an example of composite definition information regarding relocation of an element (a property element) to a lower level composite according to the second exemplary embodiment of the present invention.

FIG. 31 A diagram showing an example of composite definition information regarding the encapsulation processing and the expand processing according to the third exemplary embodiment of the present invention.

FIG. 34 A diagram showing an example of composite definition information regarding the expand processing according to the third exemplary embodiment of the present invention.

DESCRIPTION OF EMBODIMENTS

First Exemplary Embodiment

Figure 5:
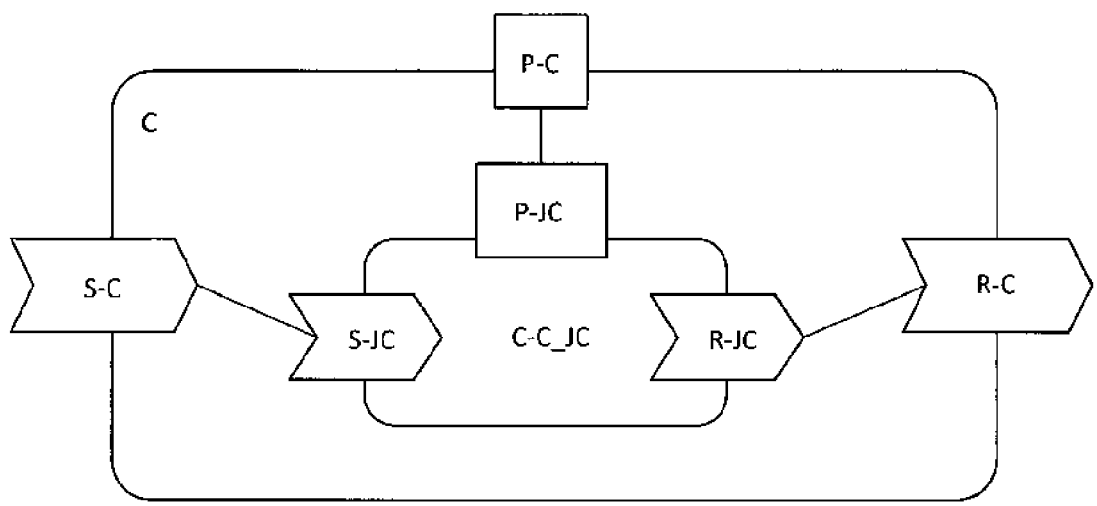
FIG. 5 A diagram showing a description example of the composite definition information with a graphical format.

Next, a first exemplary embodiment of the present invention will be described.

First, a configuration of the first exemplary embodiment of the present invention will be described. FIG. 2 is a block diagram showing a configuration of a refactoring system to which a refactoring device 100 according to the first exemplary embodiment of the present invention is applied.

Referring to FIG. 2, the refactoring system according to the first exemplary embodiment of the present invention includes the refactoring device 100 and a user terminal 200. The refactoring device 100 includes a relocation unit 111, a complement unit 112, and a composite information storage unit 113. The relocation unit 111 and the user terminal 200 are communicably connected via a network or the like.

Here, composite definition information that is information about a configuration of a program component is stored in the composite information storage unit 113.

The relocation unit 111 receives a refactoring request from the user terminal 200, performs relocation (movement) of elements that included in a program component according to the refactoring request, updates the composite definition information, and presents the definition information after update to a user.

When the refactoring request is received from the user terminal 200, the relocation unit 111 determines whether the refactoring is performable or not and performs relocation (movement) of the elements for the request judged to be performable.

When the relocation (movement) of the elements by the relocation unit 111 is completed, the complement unit 112 complements elements in such a way that functionality of the whole program, which is a refactoring target, is maintained.

Further, the refactoring device 100 may be a computer that includes a CPU and a storage medium storing a program and operates by the control based on the program.

Next, a specific example of composite definition information is indicated. FIG. 3 and FIG. 4 are diagrams showing a description example of the composite definition information with an XML format. FIG. 3 is definition information regarding composite C, and FIG. 4 is definition information regarding a composite P.

In FIG. 3, as for the definition information of a composite, the whole is enclosed with composite tags, and the name of the composite is defined with a name attribute of the composite tag. Here, a composite of the name C is defined. In the composite C, a service element, a reference element, a property element, a component element, and two wiring elements are described. These elements show a service, a reference, a property, a component, and wirings of the composite C.

The service element is enclosed with service tags, and the name of the service is defined with a name attribute of the service tag. In FIG. 3, the service of the name S-C is defined.

The reference element is enclosed with reference tags, and the name of the reference is defined with a name attribute of the reference tag. In FIG. 3, the reference of the name R-C is defined.

For the service element and the reference element described in the composite, an interface of the element may be specified using an interface tag.

The property element is enclosed with property tags, the name of the property is defined with a name attribute of the property tag, and a value of the property is defined with a body element. In FIG. 3, the property of the name P-C is defined, and "sample value" is specified as the value.

For the property element, a type of the property element may be specified using a type attribute. In FIG. 3, "string" showing that the type is a character string is specified in the type attribute.

The component element is enclosed with the component tags, and the name of the component is defined by a name attribute of the component tag. In FIG. 3, the component of the name C-C_JC is defined. In the component element, an implement element is included and a program component that is an implementation of the component is specified. In FIG. 3, an element enclosed with implement.java tags is the implement element. In this case, the implementation of the component C-C_JC is described in Java language, and Java class of the name JC is specified with a class attribute of the implement.java tag as the implementation.

The implement element in the component element may include elements of a service, a reference, and a property like a composite. In the component element, an instance of these elements is defined. The instance is defined using a service tag, a reference tag, and a property tag like a definition of each element in a composite. The instance of the element is specified by setting a value identical with the value of the name attribute of each element of the implement element, in the name attribute of these tags. In FIG. 3, Java class JC, which is the implement element of the component C-C_JC, has a property P-JC. The instance of the property P-JC is defined with the property tag in the component C-C_JC.

The instance of each element of the implement element in the component element may be related with the instance of other element in the composite including the component. For example, the service of the implement element may be used by the instance of other element in the composite, and the service required by the reference of the implement element may be provided by the instance of other element in the composite.

The value of the instance of the property of the implement element in the component element may be specified in the component element. In this case, it may be specified that the value of the property of the implement element refers to the property element defined in the composite including the component. In FIG. 3, the property P-JC in the component C-C_JC is referring to the property P-C in the composite C, and "sample value" which is the value of the property P-C is specified as the value of the property P-JC.

The wiring element is enclosed with a wire tags, a connection source of the wiring is defined with a source attribute, and a connection destination of the wiring is defined with a target attribute of the wire tag. When the value of the source attribute or the target attribute includes "/", a part in front of "/" shows a component name, and a part after "/" shows a name of a service or a reference of an implement element in the component. In FIG. 3, the wiring that connects the service S-C and the service S-JC of the component C-C_JC (not illustrated) and the wiring that connects the reference R-JC of the component C-C_JC (not illustrated) and the reference R-C are defined.

In FIG. 4, a composite P includes a service S-P, a component C1-P_C and a component C2-P_O.

Here, in the component C1-P_C, a composite C is specified as an implement element (it is specified to use an instance of a composite C as the component C1-P_C). Thus, when a composite is specified as an implement element of a component, an implement.composite tag is used, and a composite name of the composite that is an implementation of the component is specified with the name attribute.

Similarly, in the component C2-P_O, a composite O (not illustrated) is specified as an implement element. Here, the composite O has a service S-O (not illustrated).

In the component C1-P_C, a property element is specified and an "overwriting value" is specified as a value of the property P-C defined in the composite C that is the implement element of the component C1-P_C.

The composite P further includes a wiring that connects the reference R-C of the component C1-P_C and the service S-O of the component C2-P_O and a wiring that connects the service S-P and service S-C in the component C1-P_C.

At the time of execution of the composite P, the composite C is instantiated as the component C1-P_C and the Java class JC is instantiated as the component C-C_JC of the composite C. To the property P-C of the composite C, the value "overwriting value" specified in the component C1-P_C is set. In the property element in the component C-C_JC of the composite C, the value of the property P-JC in Java class JC, which is the implement element, refers to the property P-C. Therefore, the "overwriting value" is set to the value of the property P-C in the object of the instantiated Java class JC. A service requested by the composite C as the reference R-C is provided by the service S-O of the composite O in the composite P.

Thus, the Java class JC, the composite C and the composite O, which are program components, are combined, and the value or the service required by each composite, that is, the dependency between composites is solved. Thereby, the executable and more specific service S-P is obtained. When the dependency is not solved, the composite is not instantiated or an error is outputted when the program is executed. In this case, the service cannot be provided.

In the first exemplary embodiment of the present invention, a refactoring request that the relocation unit 111 receives from the user terminal 200 is a request for a relocation of elements between composites. The refactoring request includes, in addition to information indicating the relocation of elements between composites, a name of a composite of the relocation source, a name of an element of the relocation target, and a name of the composite of the relocation destination. For example, a character string of "replace C2-P_O P C" or the like may be used as such a request.

For example, when the refactoring request is "replace C1-P_O P C", the relocation of elements between composites is to delete the component C1-P_O from the composite P, and add this to the composite C. When such operation is performed, the above-mentioned dependency between composites may not be solved. The complementation of an element by the complement unit 112 according to the first exemplary embodiment of the present invention is to add an element to each composite appropriately after relocating elements in such a way that the dependency is solved continuously.

Figure 6:
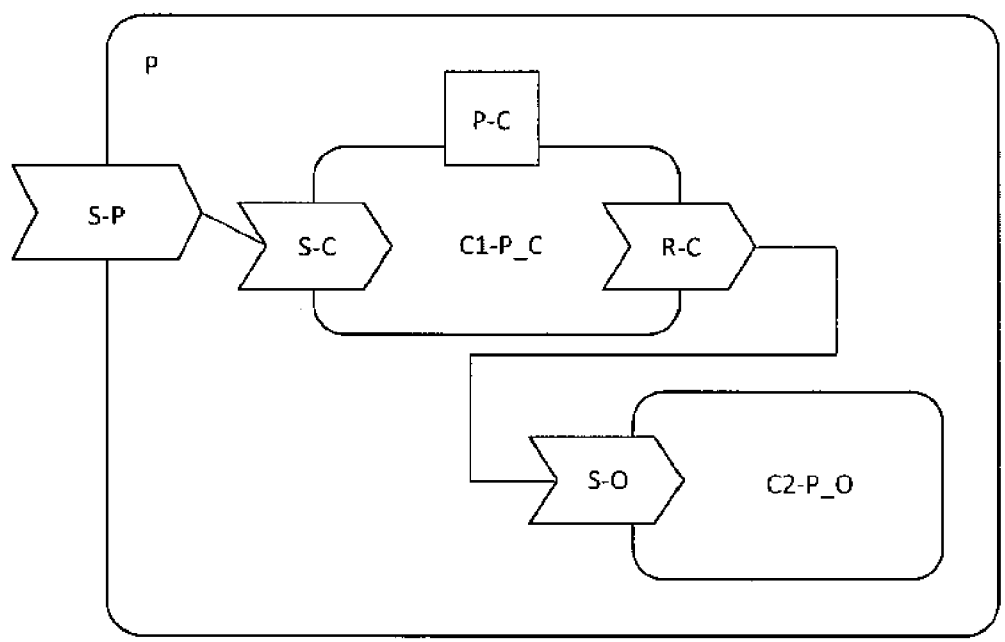
FIG. 6 A diagram showing another description example of the composite definition information with a graphical format.

FIG. 5 and FIG. 6 are diagrams showing description examples of the composite definition information with a graphical format. FIG. 5 and FIG. 6 correspond to the composite C of FIG. 3 and the composite P of FIG. 4, respectively.

In FIG. 5 and FIG. 6, a composite and a component are expressed by a rectangle shape with rounded corners, respectively. A service of the composite or an implement element of the component is expressed with a shape located over the left side of the composite or the component. A reference of the composite or the implement element of the component is expressed with a shape located over the right side of the composite or the component. A property of the composite or the implement element of the component is expressed with a rectangle located over the upper side of the composite or the component. A wiring is expressed with a line that connects elements. A reference relationship of properties is expressed with a line that connects properties. The name of each element is shown in the element.

Figure 7:
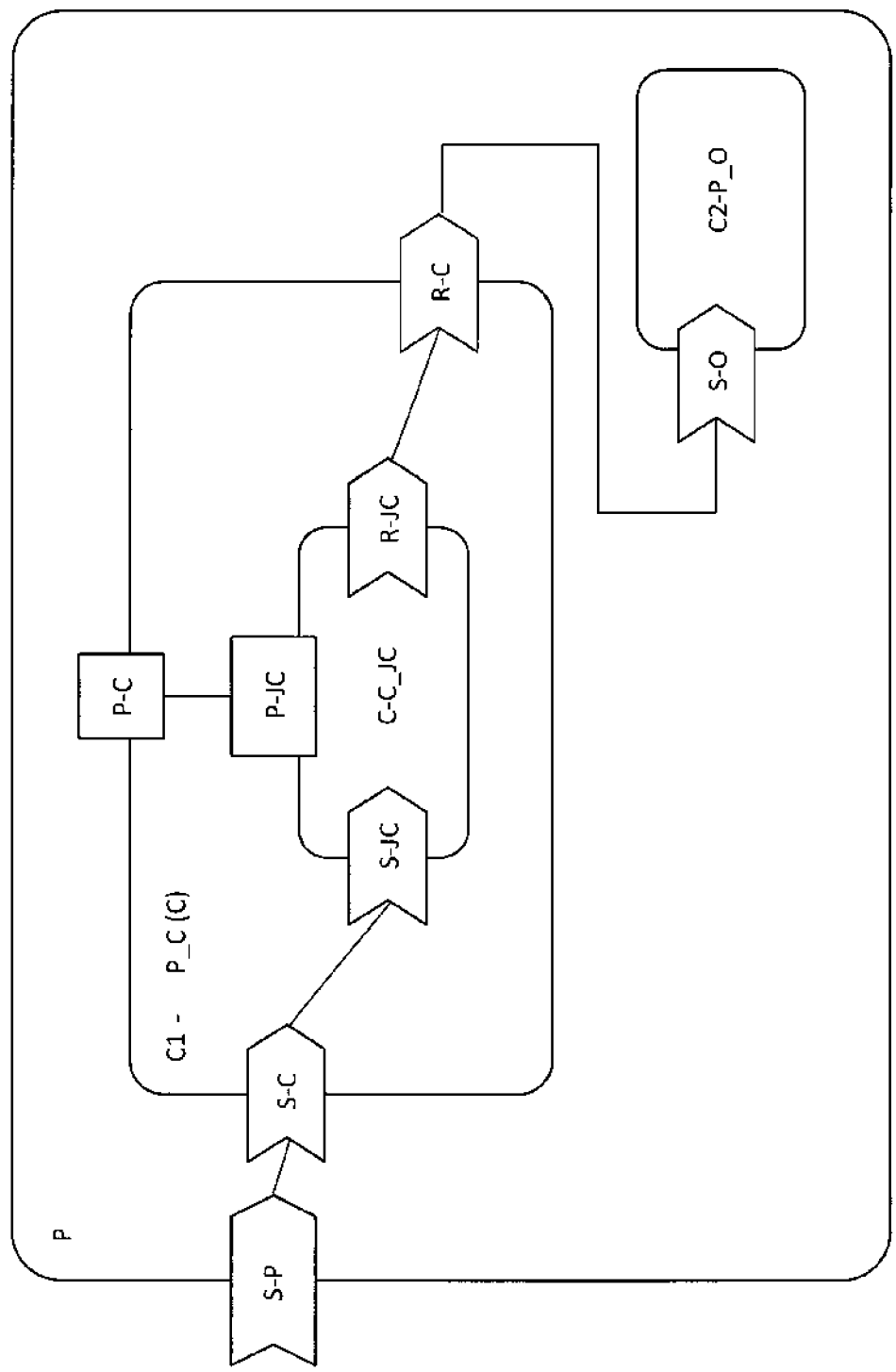
FIG. 7 A diagram showing still another description example of the composite definition information with a graphical format.

FIG. 7 is a diagram showing another description example of the composite definition information with a graphical format. Hereinafter, as shown in FIG. 7, the definition information of a composite, and other composite that is an implement element of a component included in the composite are shown on the same diagram. In this case, the definition information of the other composite which is the implement element of the component is located in the rectangle of the component, the name of the other composite is shown in "( )". In FIG. 7, the definition information of the composite C is located in the rectangle of the component C1-P_C in the definition information of the composite P.

Note that, hereinafter, when an implement element of a component included in a composite A is a composite B, the composite A is an upper level composite of the composite B, and the composite B is a lower level composite of the composite A.

Next, operation of the refactoring device 100 according to the first exemplary embodiment of the present invention will be described.

<Outline of Refactoring Processing>

Figure 8:
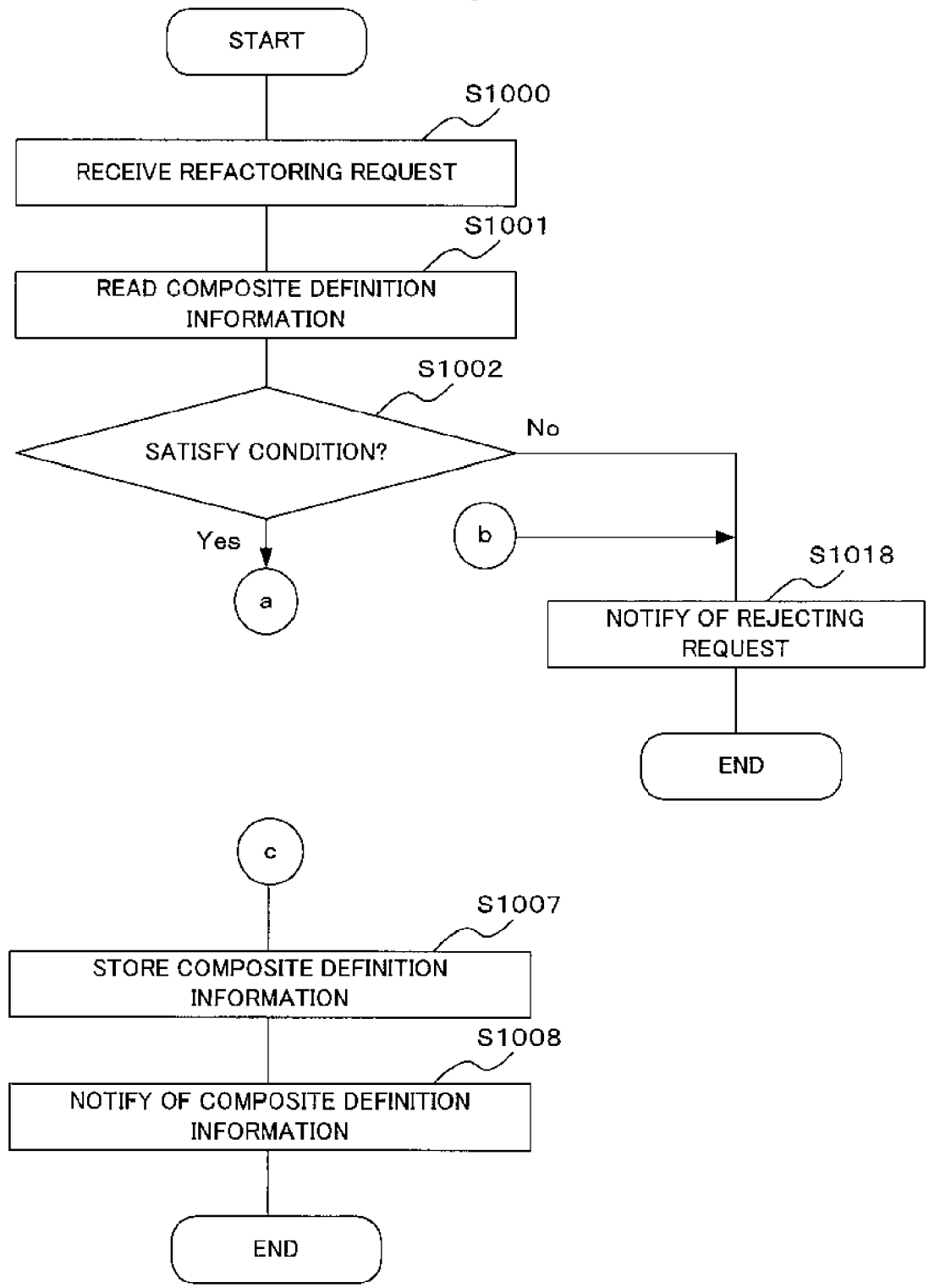
FIG. 8 A flow chart showing the outline of refactoring processing according to the first exemplary embodiment of the present invention.
Figure 9:
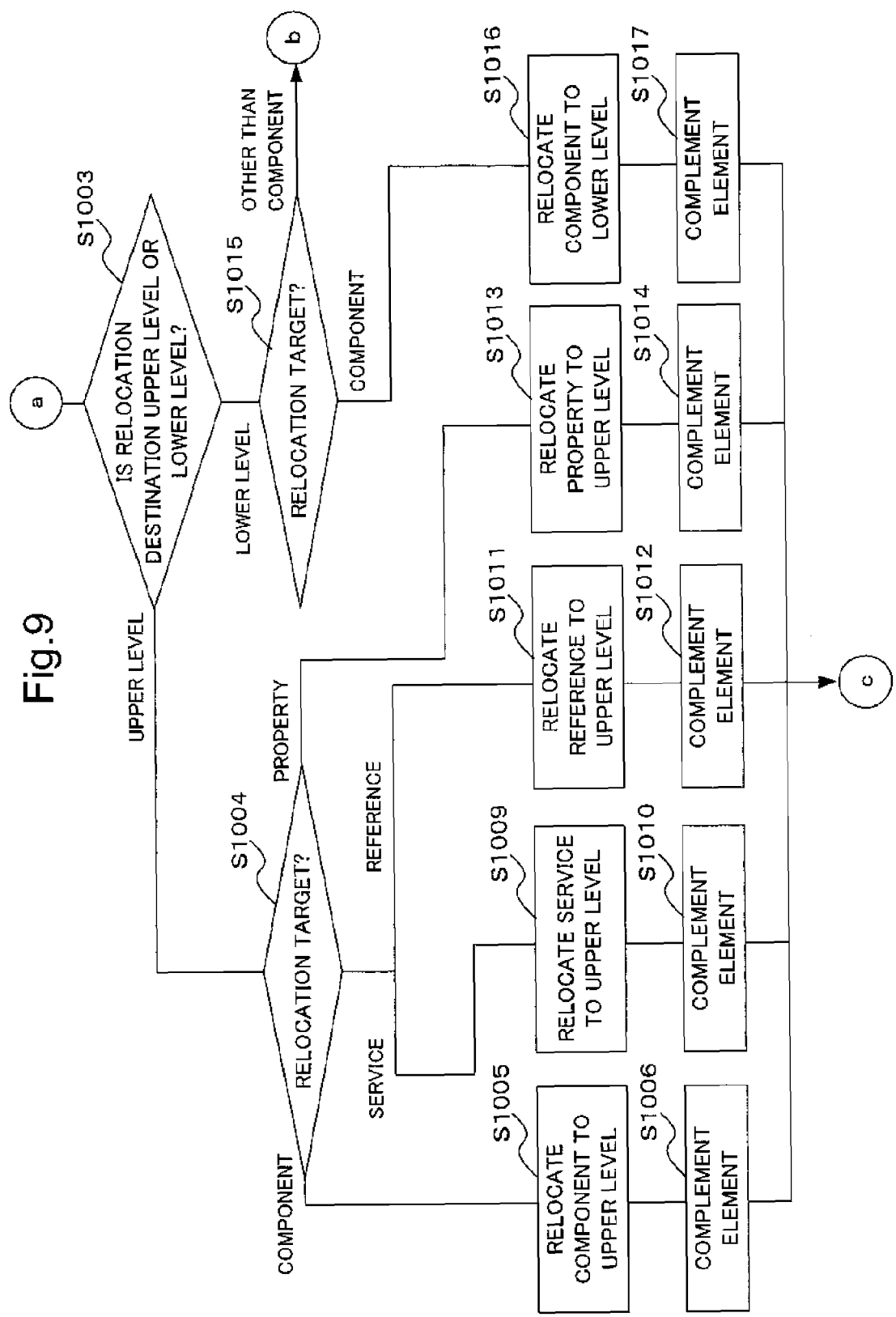
FIG. 9 A flow chart showing the outline of the refactoring processing according to the first exemplary embodiment of the present invention (continuation of FIG. 8).

FIG. 8 and FIG. 9 are flow charts showing the outline of refactoring processing according to the first exemplary embodiment of the present invention. Here, the outline of refactoring processing is described, and the details of the complement processing depending on a relocation target element are described later.

When the relocation unit 111 receives a refactoring request from the user terminal 200 (Step S1000), the relocation unit 111 reads out the definition information of the relocation source composite and the definition information of the relocation destination composite stored in the composite information storage unit 113 (Step S1001). The relocation unit 111 determines, on the basis of the read out definition information, whether the refactoring according to the refactoring request is performable. Here, the relocation unit 111 confirms whether the refactoring request satisfies a predetermined condition (Step S1002). The predetermined condition is, for example, satisfying all of the following conditions: the received refactoring request includes the name of the relocation source composite, the name of the relocation target element, and the name of the relocation destination composite; the definition information of the relocation source composite and the definition information of the relocation destination composite are stored in the composite information storage unit 113, and the relocation target element is included in the relocation source composite; and regarding the relation between the relocation destination composite and the relocation source composite, one is the upper level composite of another one. Otherwise, it is determined that the refactoring is not performable.

When the refactoring request does not satisfy the condition (Step S1002/NO), the relocation unit 111 notifies the user of rejecting the refactoring request (Step S1018), and ends the refactoring processing.

When the refactoring request satisfies the condition (Step S1002/YES), the relocation unit 111 determines whether the relocation destination composite is an upper level composite or a lower level composite of the relocation source composite (Step S1003).

When the relocation destination composite is an upper level composite of the relocation source composite (Step S1003/UPPER LEVEL), the relocation unit 111 determines which of a component, a service, a reference and a property is the relocation target element (Step S1004).

When the relocation target element is a component (Step S1004/COMPONENT), the relocation unit 111 deletes the component element of the relocation target from the definition information of the relocation source (lower level) composite and adds (relocates) it to the definition information of the relocation destination (Upper level) composite, according to the refactoring request (Step S1005).

The complement unit 112 complements the element regarding the relocation into the upper level composite of the component (Step S1006).

The relocation unit 111 stores the definition information of the relocation source composite and the definition information of the relocation destination composite updated, as a result of the relocation and the complement, into the composite information storage unit 113 (Step S1007), notifies it to the user terminal 200 (Step S1008), and ends the refactoring processing.

When the relocation target element is a service in Step S1004 (Step S1004/SERVICE), the relocation unit 111 deletes the service element of the relocation target from the definition information of the relocation source (lower level) composite and adds (relocates) it into the definition information of the relocation destination (upper level) composite, according to the refactoring request (Step S1009).

The complement unit 112 complements the element regarding the relocation into the upper level composite of the service (Step S1010), and proceeds to Step S1007.

When the element of the relocation target is a reference in Step S1004 (Step S1004/REFERENCE), the relocation unit 111 deletes the reference element of the relocation target from the definition information of the relocation source (lower level) composite and adds (relocates) it into the definition information of the relocation destination (upper level) composite, according to the refactoring request (Step S1011).

The complement unit 112 complements the element regarding the relocation into the upper level composite of the reference (Step S1012), and proceeds to Step S1007.

When the element of the relocation target is a property in Step S1004 (Step S1004/PROPERTY), the relocation unit 111 deletes the property element of the relocation target from the definition information of the relocation source (lower level) composite and adds (relocates) it into the definition information of the relocation destination (upper level) composite, according to the refactoring request (Step S1013).

The complement unit 112 complements the element regarding the relocation into the upper level composite of the property (Step S1014), and proceeds to Step S1007.

On the other hand, when the relocation destination composite is a lower level composite of the relocation source composite in Step S1003 (Step S1003/LOWER LEVEL), the relocation unit 111 determines whether the relocation target element is a component (Step S1015).

When the element of the relocation target is a component (Step S1015/COMPONENT), the relocation unit 111 deletes the component element of the relocation target from the definition information of the relocation source (upper level) composite and adds (relocates) it into the definition information of the relocation destination (lower level) composite, according to the refactoring request (Step S1016).

The complement unit 112 complements the element regarding the relocation into the lower level component of the component (Step S1017), and proceeds to Step S1007.

When the element of the relocation target is not a component in Step S1015 (Step S1015/OTHER THAN COMPONENT), the relocation unit 111 proceeds to Step S1018 and ends the refactoring processing.

Next, the details of the complement processing depending on a relocation target element will be described.

<Relocation of Component Element to Upper Level Composite>

Figure 10:
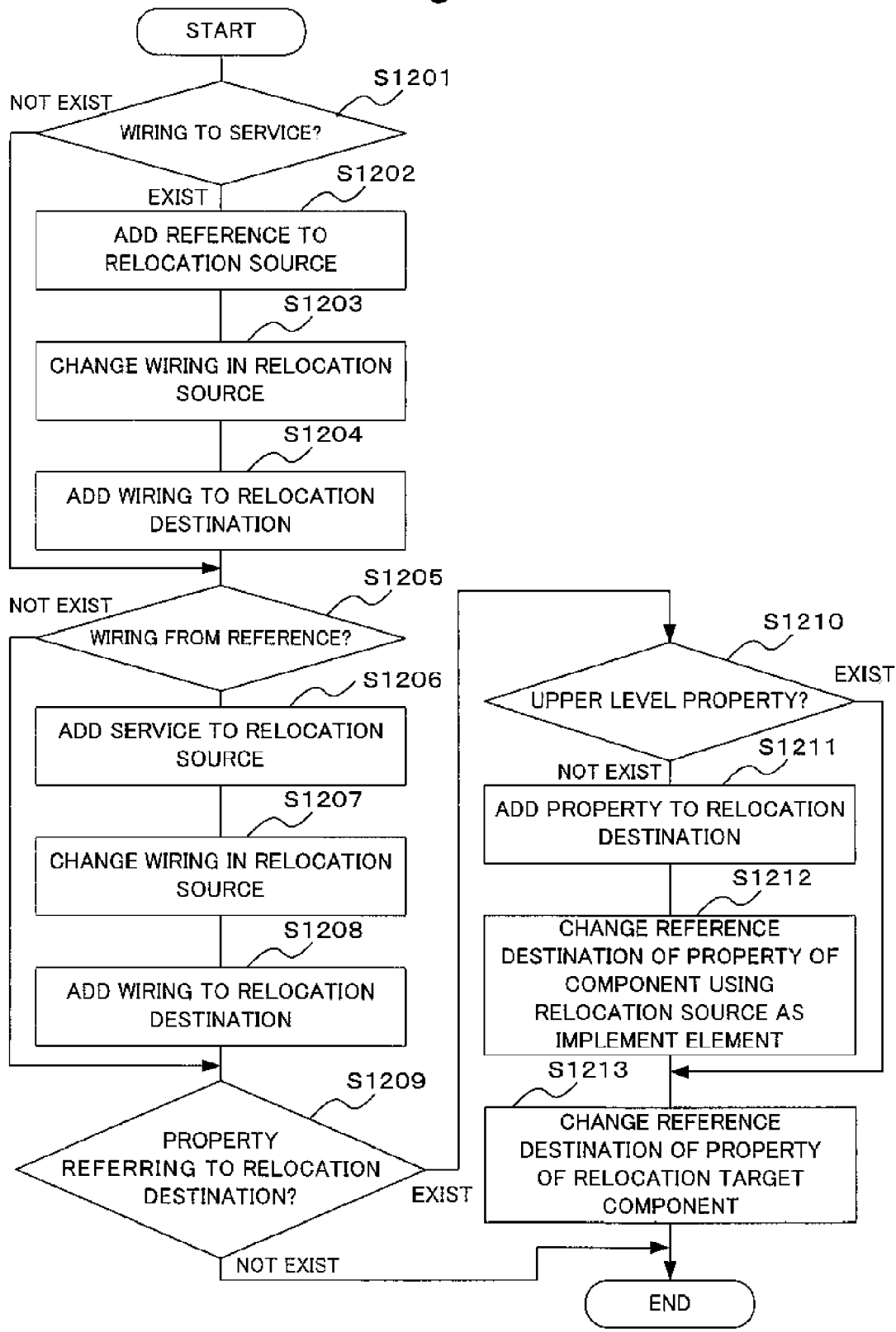
FIG. 10 A flow chart showing the details of complement processing regarding relocation of a component element to an upper level composite according to the first exemplary embodiment of the present invention.

FIG. 10 is a flow chart showing the details of the complement processing (Step S1006) regarding relocation of a component element to an upper level composite according to the first exemplary embodiment of the present invention. FIG. 11 is a diagram showing an example of composite definition information regarding relocation of a component element to an upper level composite according to the first exemplary embodiment of the present invention.

Here, the complement processing is described as an example of the case where a relocation target component C-C_O included in a relocation source composite C shown in the state (a) of FIG. 11 is relocated to an upper level relocation destination composite P as shown in the state (b) of the FIG. 11.

The complement unit 112 determines whether there is a wiring (a wiring C_S-O) specifying a service S-O of the relocation target component C-C_O as a connection destination, in the definition information of the relocation source composite C (Step S1201).

When there is such a wiring C_S-O (Step S1201/EXIST), the complement unit 112 adds a reference R2-C having the same interface as that of the service S-O into the definition information of the relocation source composite C for each of all services S-O specified as a connection destination (Step S1202). The complement unit 112, for each of all wirings C_S-O specifying the service S-O as a connection destination, changes the connection destination to the added reference R2-C (Step S1203).

The complement unit 112 adds a wiring connecting the reference R2-C of the component C-P_C using the composite C as an implement element and the service S-O of the relocation target component C-C_O, into the definition information of the relocation destination composite P (Step S1204), and proceeds to Step S1205.

In Step S1201, when there is no such a wiring C_S-O (Step S1201/NOT EXIST), the complement unit 112 proceeds to Step S1205.

Next, the complement unit 112 determines whether there is a wiring (a wiring R-O_C) specifying a reference R-O of the relocation target component C-C_O as a connection source, in the definition information of the relocation source composite C (Step S1205).

When there is such a wiring R-O_C (Step S1205/EXIST), the complement unit 112 adds a service S2-C having the same interface as that of the reference R-O into the definition information of the relocation source composite C for each of all references R-O specified as a connection source (Step S1206). The complement unit 112, for each of all wirings R-O_C specifying the reference R-O as a connection source, changes the connection source to the added service S2-C (Step S1207).

The complement unit 112 adds a wiring connecting the service S2-C of the component C-P_C using the composite C as an implement element and the reference R-O of the relocation target component C-C_O, into the definition information of the relocation destination composite P (Step S1208), and proceeds to Step S1209.

In Step S1205, when there is no such a wiring R-O_C (Step S1205/NOT EXIST), the complement unit 112 proceeds to Step S1209.

Next, the complement unit 112 determines whether there is an instance of a property P-O referring to a property P-C of the relocation source composite C in the relocation target component C-C_O, with reference to the definition information of the relocation destination composite P (Step S1209).

When there is such an instance of a property P-O (Step S1209/EXIST), the complement unit 112 determines whether there is an upper level property P-P in the definition information of the relocation destination composite P, for each of all of such instances of properties P-O (Step S1210). Here, the upper level property P-P is a property specified as a reference destination of an instance of the property P-C in the component C-P_C using the relocation source composite C in the relocation destination composite P as an implement element.

When there is no such an upper level property P-P (Step S1210/NOT EXIST), the complement unit 112 adds the property P-P having the same type as that of the property P-C into the definition information of the relocation destination composite P (Step S1211). The complement unit 112 changes the reference destination of the instance of the property P-C in the component C-P_C into the added property P-P, in the definition information of the relocation destination composite P (Step S1212). The complement unit 112 changes the reference destination of the instance of the property P-O in the relocation target component C-C_O into the added property P-P (Step S1213), and ends the complement processing.

In Step S1210, when there is such an upper level property P-P (Step S1210/EXIST), the complement unit 112 changes the reference destination of the instance of the property P-O in the relocation target component C-C_O into the property P-P, in the definition information of the relocation destination composite P (Step S1213), and ends the complement processing.

The definition information of each composite, as the result of this, is shown as the state (c) of FIG. 11.

In Step S1209, when there is no such an instance of the property P-O referring to the property P-C of the relocation source composite C (NOT EXIST in Step S1209), the complement unit 112 ends the complement processing.

<Relocation of Service Element to Upper Level Composite>

Figure 12:
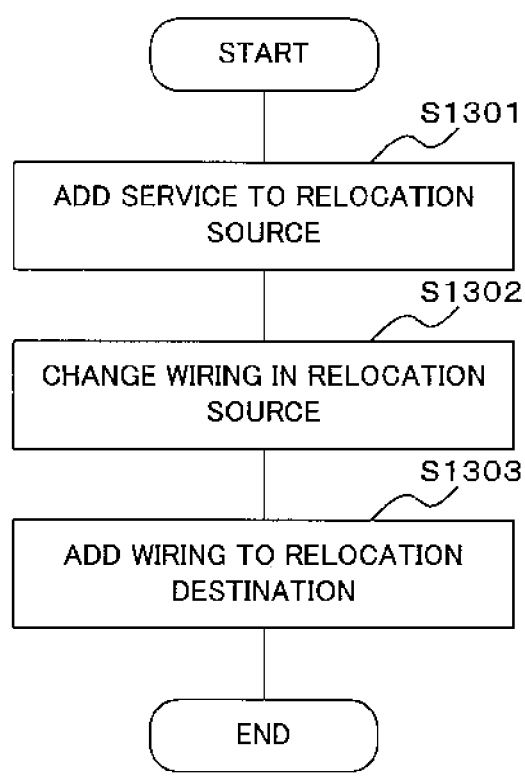
FIG. 12 A flow chart showing the details of the complement processing regarding relocation of a service element to an upper level composite according to the first exemplary embodiment of the present invention.

FIG. 12 is a flow chart showing the details of the complement processing (Step S1010) regarding relocation of a service element to an upper level composite according to the first the first exemplary embodiment of the present invention. FIG. 13 is a diagram showing an example of composite definition information regarding relocation of a service element to an upper level composite according to the first exemplary embodiment of the present invention.

Here, the complement processing is described as an example of the case where a relocation target S-C included in a relocation source composite C shown in the state (a) of FIG. 13 is relocated to an upper level relocation destination composite P as shown in the state (b) of FIG. 13.

The complement unit 112 adds the service S2-C having the same interface as that of the relocation target service S-C into the definition information of the relocation source composite C (Step S1301). The complement unit 112, for each of all wiring elements specifying the relocation target service S-C as a connection source, changes the connection source into the added service S2-C, in the relocation source composite C (Step S1302). The complement unit 112 adds a wiring connecting the service S2-C of a component C-P_C using the composite C as an implement element and the service S-C into the definition information of the relocation destination composite P (Step S1303).

The definition information of each composite, as the result of this, is shown as the state (c) of FIG. 13.

<Relocation of Reference Element to Upper Level Composite>

Figure 14:
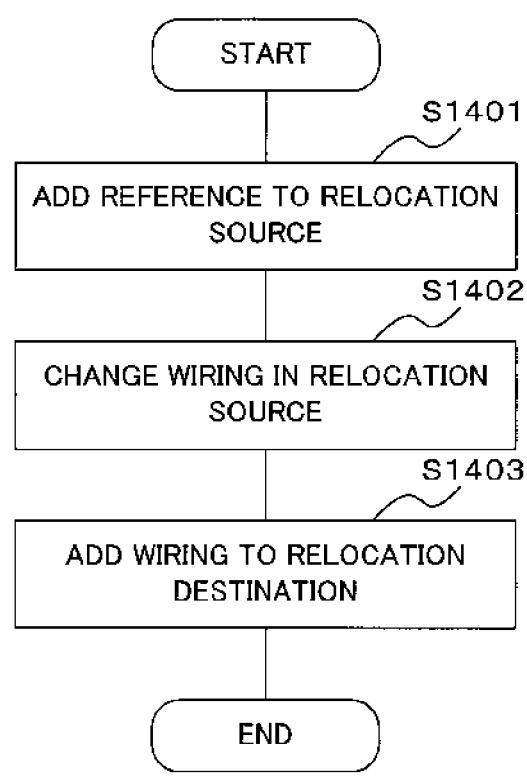
FIG. 14 A flow chart showing the details of the complement processing regarding relocation of a reference element to an upper level composite according to the first exemplary embodiment of the present invention.

FIG. 14 is a flow chart showing the details of the complement processing (Step S1012) regarding relocation of a reference element to an upper level composite according to the first exemplary embodiment of the present invention. FIG. 15 is a diagram showing an example of composite definition information regarding relocation of a reference element to an upper level composite according to the first exemplary embodiment of the present invention.

Here, the complement processing is described as an example of the case where a relocation target R-C included in a relocation source composite C shown in the state (a) of FIG. 15 is relocated to an upper level relocation destination composite P as shown in the state (b) of FIG. 15.

The complement unit 112 adds the reference R2-C having the same interface as that of the relocation target reference R-C into the definition information of the relocation source composite C (Step S1401). The complement unit 112, for each of all wiring elements specifying the relocation target reference R-C as a connection destination, changes the connection destination into the added reference R2-C, in the relocation source composite C (Step S1402). The complement unit 112 adds a wiring connecting the reference R2-C of a component C-P_C using the composite C as an implement element and the reference R-C into the definition information of the relocation destination composite P (Step S1403).

The definition information of each composite, as the result of this, is shown as the state (c) of FIG. 15.

<Relocation of Property Element to Upper Level Composite>

Figure 16:
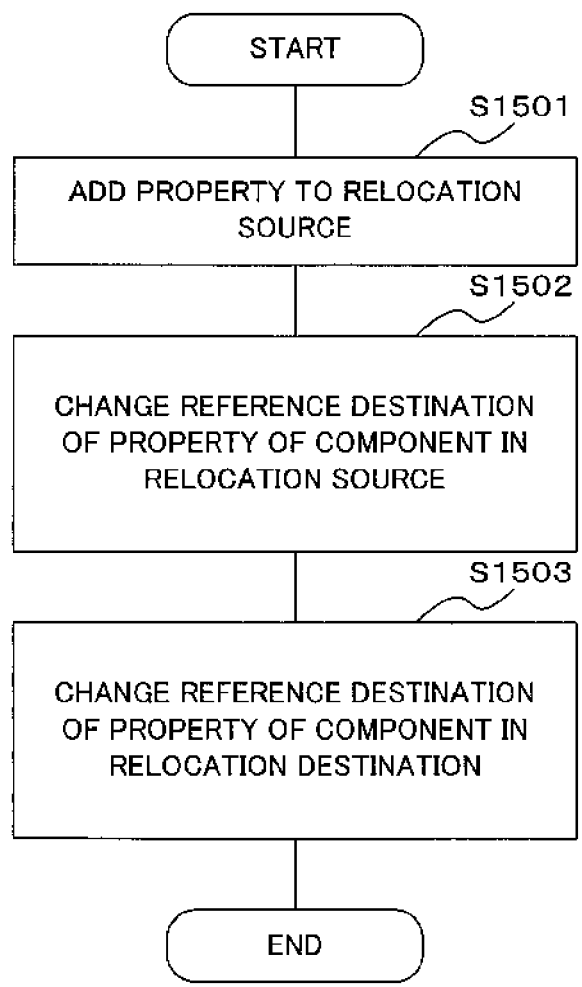
FIG. 16 A flow chart showing the details of the complement processing regarding relocation of a property element to an upper level composite according to the first exemplary embodiment of the present invention.

FIG. 16 is a flow chart showing the details of the complement processing (Step S1014) regarding relocation of a property element to an upper level composite according to the first exemplary embodiment of the present invention. FIG. 17 is a diagram showing an example of composite definition information regarding relocation of a property element to an upper level composite according to the first exemplary embodiment of the present invention.

Here, the complement processing is described as an example of the case where a relocation target P-C included in a relocation source composite C shown in the state (a) of FIG. 17 is relocated to an upper level relocation destination composite P as shown in the state (b) of FIG. 17.

The complement unit 112 adds the property P2-C having the same type as that of the relocation target property P-C into the definition information of the relocation source composite C (Step S1501). The complement unit 112, for each of all property elements specifying the relocation target property P-C as a reference destination among property elements in a component of the relocation source composite C, changes the reference destination into the added property P2-C (Step S1502). When there is no instance of the property P2-C in a component C-P_C using the composite C as an implement element, the complement unit 112 adds it into the component C-P_C, and sets the relocated property P-C into the reference destination of the added instance, in the definition information of the relocation destination composite P (Step 1503).

The definition information of each composite, as the result of this, is shown as the state (c) of FIG. 17.

<Relocation of Component Element to Lower Level Composite>

Figure 18:
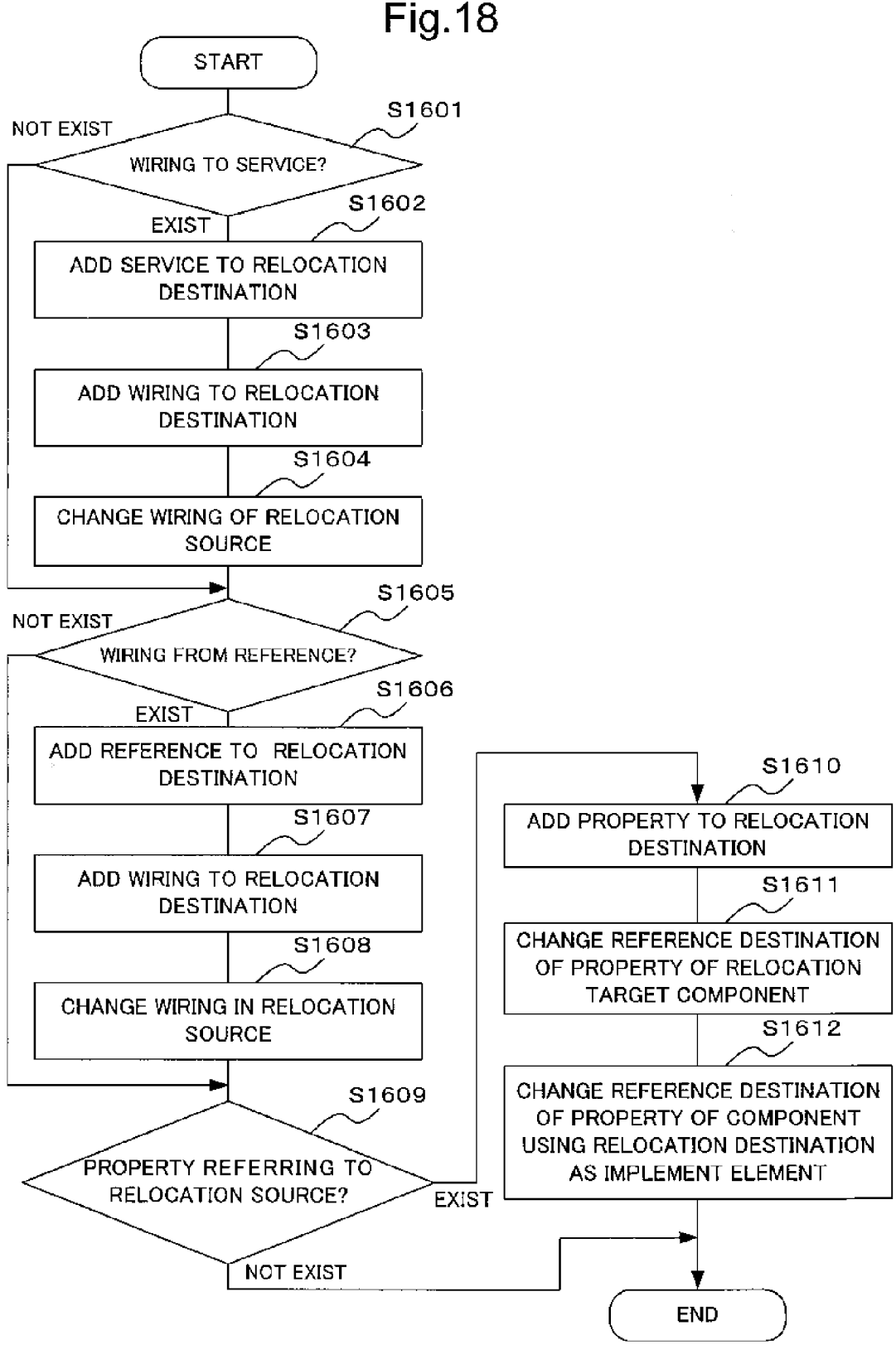
FIG. 18 A flow chart showing the details of the complement processing regarding relocation of a component element to a lower level composite according to the first exemplary embodiment of the present invention.

FIG. 18 is a flow chart showing the details of the complement processing (Step S1017) regarding relocation of a component element to a lower level composite according to the first exemplary embodiment of the present invention. FIG. 19 is a diagram showing an example of composite definition information regarding relocation of a component element to a lower level composite according to the first exemplary embodiment of the present invention.

Here, the complement processing is described as an example of the case where a relocation target component C-P_C included in a relocation source composite P shown in the state (a) of FIG. 19 is relocated to a lower level relocation destination composite O as shown in the state (b) of FIG. 19.

The complement unit 112 determines whether there is a wiring (a wiring P_S-C) specifying a service S-C of the relocation target component C-P_C as a connection destination, in the definition information of the relocation source composite P (Step S1601).

When there is such a wiring P_S-C (Step S1601/EXIST), the complement unit 112 adds a service S-O having the same interface as that of the service S-C into the definition information of the relocation destination composite O for each of all services S-C specified as the connection destinations (Step S1602). The complement unit 112 adds a wiring connecting the added service S-O and the service S-C of the relocation target component C-P_C (Step S1603). The complement unit 112, for each of all wirings P_S-C specifying the service S-C as a connection destination, changes the connection destination into the service S-O of a component C2-P_O using the relocation destination composite O as an implement element, in the definition information of the composite P (Step S1604), and proceeds to Step S1605.

In Step S1601, when there is no such a wiring P_S-C (Step S1601/NOT EXIST), the complement unit 112 proceeds to Step S1605.

Next, the complement unit 112 determines whether there is a wiring (a wiring R-C_P) specifying a reference R-C of the relocation target component C-P_C as a connection source, in the relocation source composite P (Step S1605).

When there is such a wiring R-C_P (Step S1605/EXIST), the complement unit 112 adds a reference R-O having the same interface as that of the reference R-C into the definition information of the relocation destination composite O for each of all references R-C specified as a connection source (Step S1606). The complement unit 112 adds a wiring connecting the added reference R-O and the reference R-C of the relocation target component C-P_C (Step S1607). The complement unit 112, for each of all wirings R-C_P specifying the reference R-C as a connection source, changes the connection source into the reference R-O of a component C2-P_O using the relocation destination composite O as an implement element, in the definition information of the composite P (Step S1608), and proceeds to Step S1609.

In Step S1605, when there is no such a wiring R-C_P (Step S1605/NOT EXIST), the complement unit 112 proceeds to Step S1609.

Next, the complement unit 112 determines whether there is an instance of a property P-C referring to a property P-P of the relocation source composite P in the relocation target component C-P_C, referring to the definition information of the relocation destination composite O (Step S1609).

When there is such an instance of a property P-C (Step S1609/EXIST), the complement unit 112 adds a property P-O having the same type as that of the property P-C into the definition information of the relocation destination composite O, for each of all of such instances of properties P-C (Step S1610). The complement unit 112 changes the reference destination of the instance of the property P-C into the added property P-O, in the relocation target component C-P_C (Step S1611). The complement unit 112, changes the reference destination of the instance of the property P-O in the component C2-P_O into the property P-P, in the definition information of the relocation source composite P (Step S1612) and ends the complement processing.

The definition information of each composite, as the result of this, is shown as the state (c) of FIG. 19.

In Step S1609, when there is no such a property P-C referring to the property P-P in the relocation source composite P (Step S1609/NOT EXIST), the complement unit 112 ends the complement processing.

Thus, the operation of the refactoring device 100 according to the first exemplary embodiment of the present invention is completed.

Next, a characteristic configuration of the first exemplary embodiment of the present invention will be described. FIG. 1 is a block diagram showing a characteristic configuration of the first exemplary embodiment of the present invention.

Referring to FIG. 1, a refactoring device 100 includes a composite information storage unit 113, a relocation unit 111, and a complement unit 112.

The composite information storage unit 113 stores a plurality of composites each including, as an element, a component which defines predetermined processing or a use of an instance of other composite, a service which defines a function provided, a reference which defines a function used, and a wiring which defines a function providing relation among a component, a service, and a reference.

The relocation unit 111 moves a target component included in a second composite with a first composite as a moving destination and the second composite as a moving source, the second composite used as an instance by a component included in the first composite, the first composite and the second composite being among the plurality of composites, or moves a target component included in the first composite with the first composite as a moving source and the second composite as a moving destination.

The complement unit 112 performs complement process after moving the target component when there is a wiring between the element and the target component in the moving source. Here, the complement process adds a service or a reference into the second composite, sets a wiring which connects the added service or reference and the element into the moving source composite, and sets a wiring which connects the added service or reference and the moved target component into the moving destination composite.

According to the first exemplary embodiment of the present invention, in the method of obtaining a system by combining program components, the program components can be relocated easily. The reason is that the complement unit 112, when relocation of a component between an upper level and a lower level composite is performed by the relocation unit 111, performs complement processing. The complement processing adds at least one of a service and a reference to the lower level composite, and changes a wiring in the upper level composite and the lower level composite in such a way that a function provided by a service included in each of the upper level and the lower level composites is maintained.

Second Exemplary Embodiment

Next, a second exemplary embodiment of the present invention will be described.

The second exemplary embodiment of the present invention is different from the first exemplary embodiment of the present invention in a point that a redundant element and useless dependency caused by the complement processing are deleted from the composite definition information. Note that, in the second exemplary embodiment of the present invention, the same reference signs as the first exemplary embodiment of the present invention are used for the same units as the first exemplary embodiment of the present invention, and a detailed description thereof is omitted.

Figure 20:
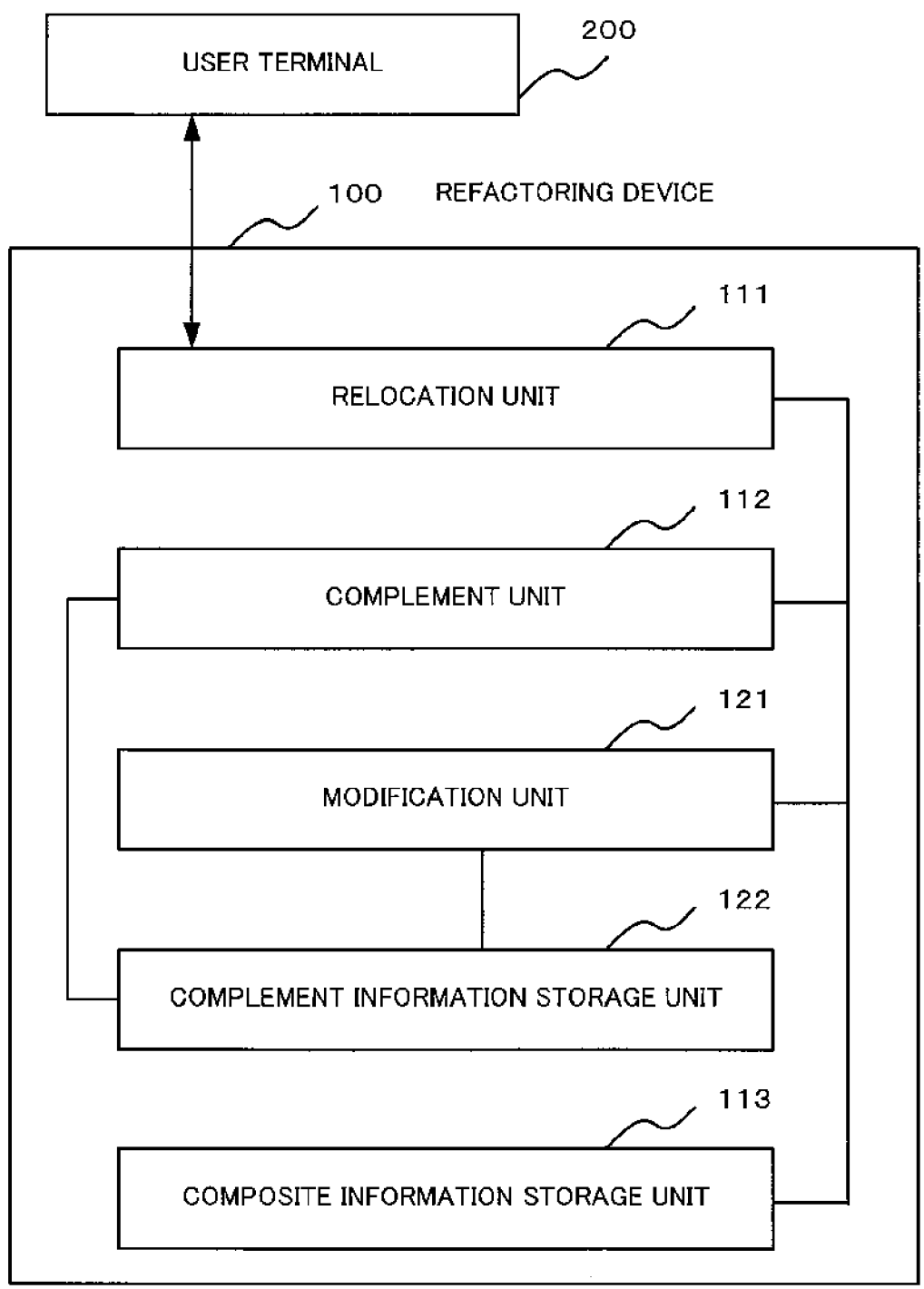
FIG. 20 A block diagram showing a configuration of a refactoring system to which a refactoring device 100 according to a second exemplary embodiment of the present invention is applied.

First, a configuration of the second exemplary embodiment of the present invention will be described. FIG. 20 is a block diagram showing a configuration of a refactoring system to which a refactoring device 100 according to the second exemplary embodiment of the present invention is applied.

Referring to FIG. 20, the refactoring device 100 according to the second exemplary embodiment of the present invention includes a modification unit 121 and a complement information storage unit 122 in addition to the configuration of the refactoring device 100 according to the first exemplary embodiment of the present invention.

The complement information storage unit 122 stores complement information that indicates an element added by a complement unit 112 in relocation of an element. FIG. 21 is a diagram showing an example of complement information according to the second exemplary embodiment of the present invention. As shown in FIG. 21, the complement information includes a composite name, an element class, and an element ID. Here, as the element ID, a value of a name attribute can be used if the element has the name attribute, and a connected value of a source attribute and a target attribute can be used if the element is a wire element.

The modification unit 121 modifies composite definition information in such a way that a redundant element and a useless dependency caused by complement processing are deleted, with reference to the complement information of the complement information storage unit 122.

In the second exemplary embodiment of the present invention, a relocation unit 111 further accepts a request to end refactoring as a refactoring request from the user. For a request to end the refactoring, a character string of "quit" or the like may be used, for example.

Next, operation of the refactoring device 100 according to the second exemplary embodiment of the present invention will be described.

Figure 22:
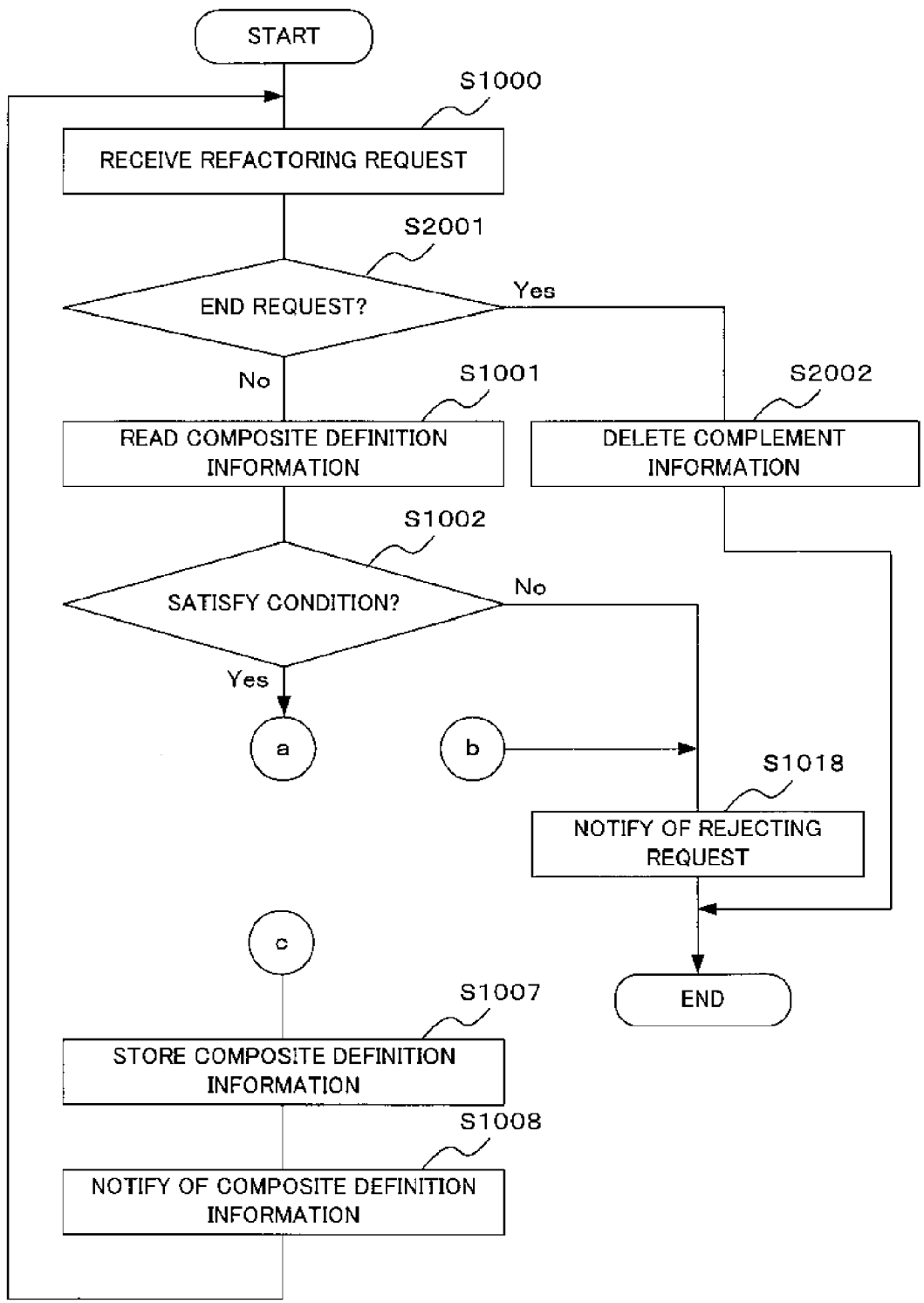
FIG. 22 A flow charts showing the outline of refactoring processing according the second exemplary embodiment of the present invention.
Figure 23:
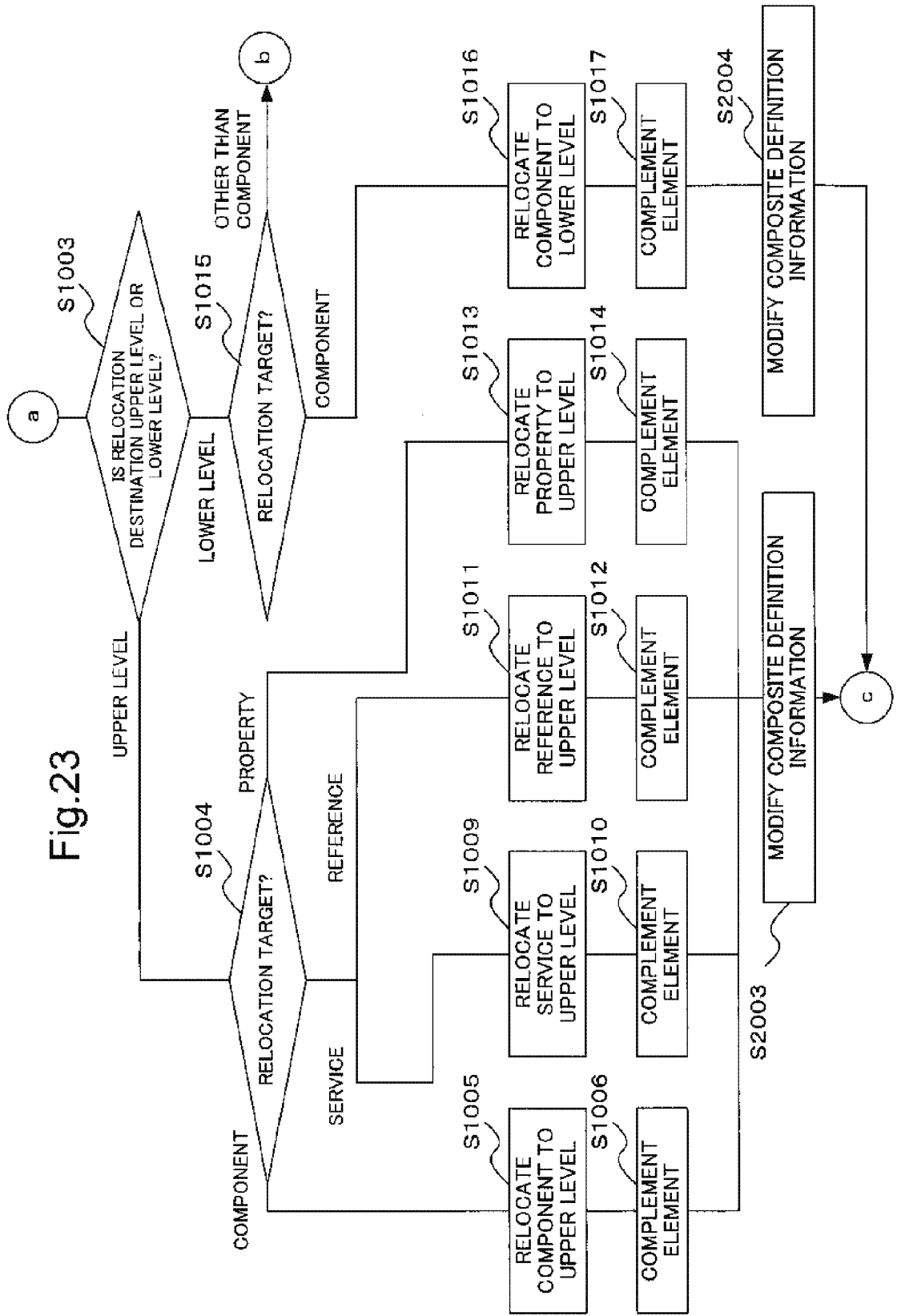
FIG. 23 A flow chart showing the outline of the refactoring processing according the second exemplary embodiment of the present invention (continuation of FIG. 22).

FIG. 22 and FIG. 23 are flow charts showing the outline of refactoring processing according the second exemplary embodiment of the present invention. In FIG. 22 and FIG. 23, the same reference signs as FIG. 8 and FIG. 9 are used for the same operations as the first exemplary embodiment, and a detailed description thereof is omitted.

In the second exemplary embodiment of the present invention, when an element is added to the composite definition information in the complement processing (Steps S1006, S1010, S1012, S1014, and S1017) by the complement unit 112, information on the element is recorded in the complement information storage unit 122 as complement information. After the complement processing by the complement unit 112, modification processing of the composite definition information by the modification unit 121 is performed. According to the second exemplary embodiment of the present invention, a refactoring request is accepted repeatedly until an end request of refactoring is received from the user.

When a refactoring request is received from a user terminal 200, the relocation unit 111 determines whether the refactoring request is an end request or not (Step S2001). When it is an end request (Step S2001/YES), the relocation unit 111 deletes the complement information stored in the complement information storage unit 122 (Step S2002) and ends the processing.

In Step S2001, when it is not an end request (Step S2001/NO), the relocation unit 111 proceeds to Step S1001.

After the complement processing (Steps S1006, S1010, S1012, S1014, and S1017) by the complement unit 112, the modification unit 121 performs modification processing (Steps S2003 and S2004) of the composite definition information. Here, the modification unit 121 acquires an element added in the complement processing, with reference to the complement information in the complement information storage unit 122.

The relocation unit 111 waits a refactoring request from the user after Step S1008, and returns to Step S1000.

Next, the details of the modification processing (Steps S2003 and S2004) of the composite definition information will be described.

<Relocation to Upper Level Composite>

Figure 24:
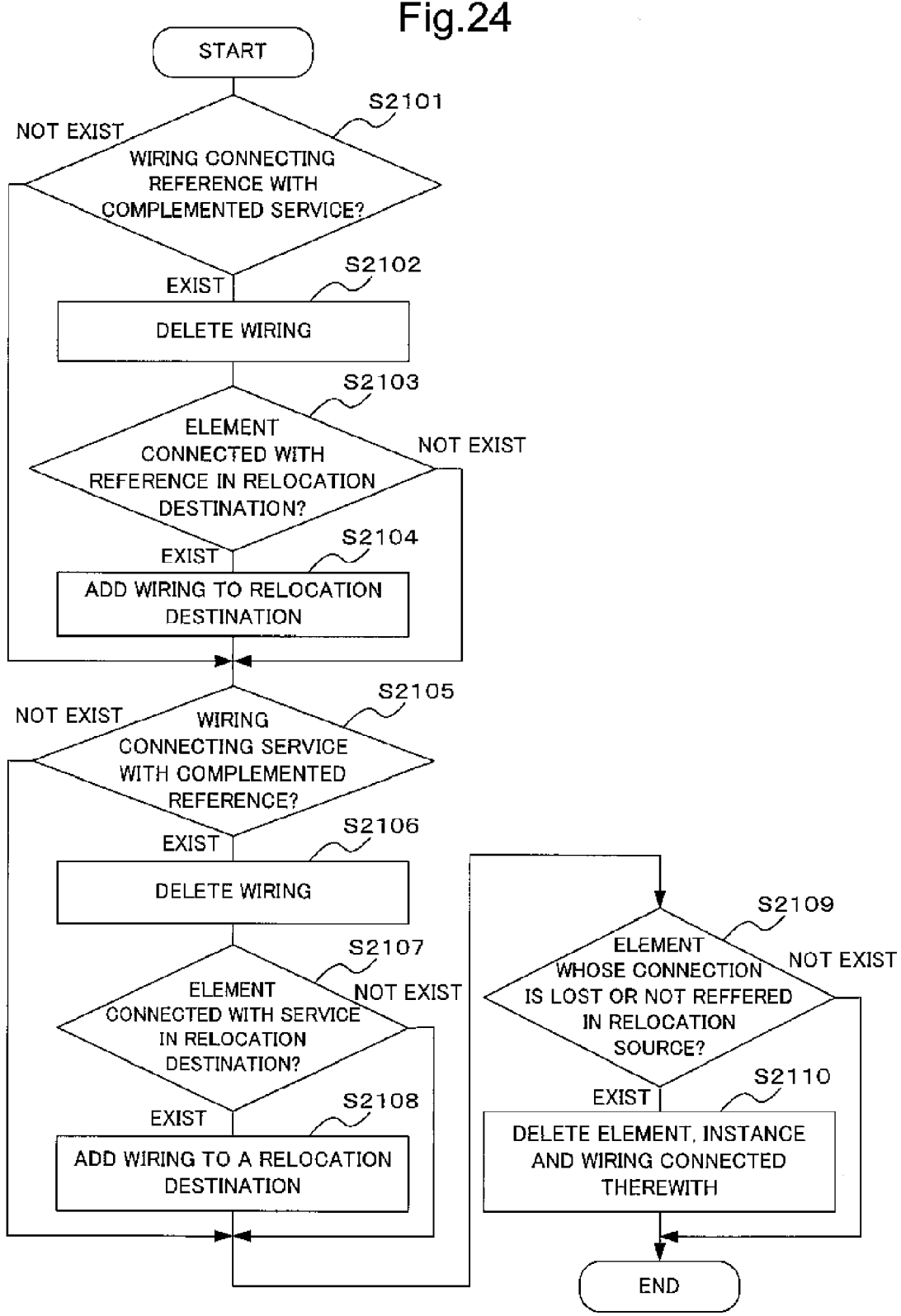
FIG. 24 A flow chart showing the details of modification processing regarding relocation of an element to an upper level composite according to the second exemplary embodiment of the present invention.

FIG. 24 is a flow chart showing the details of the modification processing (Step S2003) regarding relocation of an element to an upper level composite according to the second exemplary embodiment of the present invention. FIG. 25 and FIG. 26 are diagrams showing examples of composite definition information regarding relocation of an element to an upper level composite according to the second exemplary embodiment of the present invention. Note that, regarding composite definition information, an element other than a property (FIG. 25) and a property element (FIG. 26) are shown separately, in order to avoid complexity.

Here, as shown in the state (a) of FIG. 25 and the state (a) of FIG. 26, the modification processing of composite definition information is described for the case where a component C-C_O, a service S-C, and a reference R-C in a composite C are relocated to an upper level composite P.

In FIG. 25 and FIG. 26, an element shown with a dotted line is an element added in the complement processing. For example, a service S1-C is an element complemented in the relocation of the service S-C. A service R1-C is an element complemented in the relocation of the reference R-C. A property P1-C is an element complemented in the relocation of a property P-C. A service S2-C, a reference R2-C, and a property P-P are elements complemented in the relocation of the component C-C_O.

The modification unit 121 determines whether there is a wiring (a wiring X1) connecting a reference element and an added service element in complementation in the definition information of the relocation source composite (Step S2101). When there is such a wiring X1 (Step S2101/EXIST), the modification unit 121 deletes the wiring X1 (Step S2102).

For example, in the state (a) of FIG. 25, the modification unit 121 deletes the wiring (corresponding to the wiring X1) connecting the reference R1-C and the service S2-C added in complementation, from the relocation source composite C.

The modification unit 121 determines whether there is an element (an element X2) connecting with an instance of the reference element that is a connection destination of the deleted wiring X1 in the definition information of the relocation destination composite (Step S2103). When there is such an element X2 (Step S2103/EXIST), the modification unit 121 detects a reference element of the relocation target component which is connected with the instance of the service element which is the connection source of the deleted wiring X1 in the definition information of the relocation destination composite. The modification unit 121 adds a wiring connecting the detected reference element and the element X2 (Step S2104), and proceeds to Step S2105.

When there is no such an element X2 in Step S2103 (Step S2103/NOT EXIST) or when there is no such a wiring X1 in Step S2101 (Step S2101/NOT EXIST), the modification unit 121 proceeds to Step S2105.

For example, in the state (a) of FIG. 25, the modification unit 121 adds a wiring connecting the reference R-C (corresponding to an element X2) connected with an instance of the reference R1-C and the reference R-O of the relocation target component C-C_O connected with the instance of the service S2-C.

Next, the modification unit 121 determines whether there is a wiring (a wiring X3) connecting a service element and an added reference element in complementation in the definition information of the relocation source composite (Step S2105). When there is such a wiring X3 (Step S2105/EXIST), the modification unit 121 deletes the wiring X3 (Step S2106).

For example, in the state (a) of FIG. 25, the modification unit 121 deletes the wiring (corresponding to the wiring X3) connecting the service S1-C and the reference R2-C added in complementation, from the relocation source composite C.

The modification unit 121 determines whether there is an element (an element X4) connecting with an instance of the service element that is a connection source of the deleted wiring X3 in the definition information of the relocation destination composite (Step S2107). When there is such an element X4 (Step S2107/EXIST), the modification unit 121 detects a service element of the relocation target component which is connected with the instance of the reference element which is the connection destination of the deleted wiring X3 in the definition information of the relocation destination composite. The modification unit 121 adds a wiring connecting the detected service element and the element X4 (Step S2108), and proceeds to Step S2109.

When there is there is no such an element X4 in Step S2107 (Step S2107/NOT EXIST) or when there is no such a wiring X3 in Step S2105 (Step S2105/NOT EXIST), the modification unit 121 proceeds to Step S2109.

For example, in the state (a) of FIG. 25, the modification unit 121 adds a wiring connecting the service S-C (corresponding to the element X4) connected with an instance of the service S1-C and the service S-O in the relocation target component C-C_O connected with the instance of the reference R2-C.

The states of the relocation source and destination composites, as the result of this, are shown as the state (b) of FIG. 25.

Next, the modification unit 121 determines whether there is a service element or a reference element whose wiring to be connected is lost, or a reference element which is not referred in the definition information of the relocation source composite (Step S2109). When there is such an element (Step S2109/EXIST), the modification unit 121 deletes the element from the definition information of the relocation source composite. The modification units 121 further deletes the instance of the deleted element and the wiring connected with the instance of the deleted element, from the definition information of the relocation destination composite (Step S2110), and ends the modification processing.

When there is no such an element in Step S2109 (Step S2109/NOT EXIST), the modification unit 121 ends the modification processing.

For example, in the state (b) of FIG. 25, the service S1-C, the service S2-C, the reference R1-C, and the reference R2-C, which are the elements in the relocation source composite C, do not have a wiring to be connected. Therefore, these elements are deleted. In the state (a) of FIG. 26, if the property P1-C and the property P2-C are not referred, these elements are deleted. The modification unit 121 deletes the wiring connected with the deleted service element or the reference element, from the relocation destination composite P.

The states of the relocation source and destination composites, as the result of this, are shown as the state (c) of FIG. 25 and the state (b) of FIG. 26.

Note that, in Step S2110, if an element to be deleted is not an element added by complement processing, the modification unit 121 may delete the element after receiving a confirmation from the user.

<Relocation to Lower Level Composite>

Figure 27:
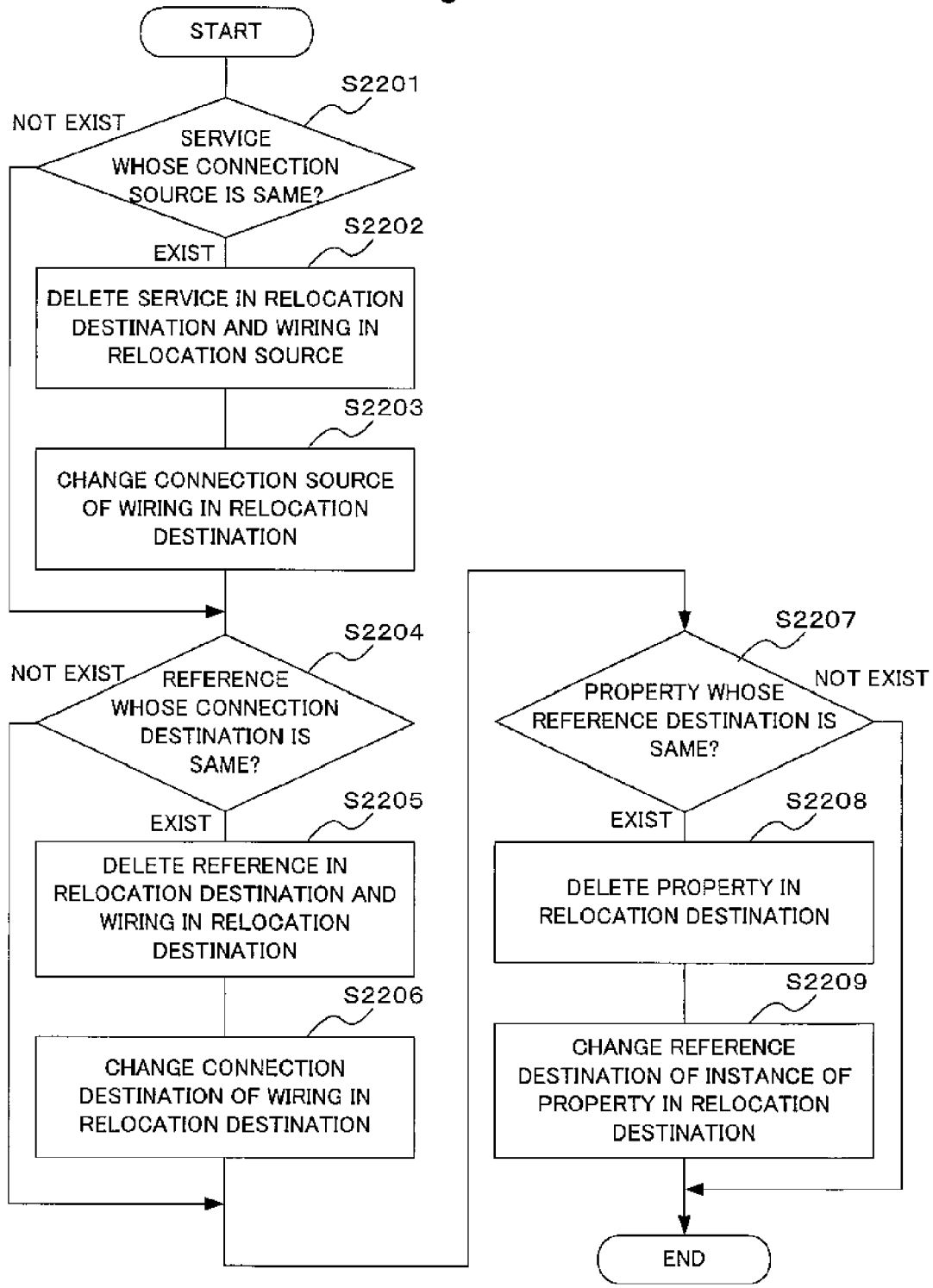
FIG. 27 A flow chart showing the details of the modification processing regarding relocation of an element to a lower level composite according to the second exemplary embodiment of the present invention.

FIG. 27 is a flow chart showing the details of the modification processing (Step S2004) regarding relocation of an element to a lower level composite according to the second exemplary embodiment of the present invention. FIG. 28 and FIG. 29 are diagrams showing examples of composite definition information regarding relocation of an element to a lower level composite according to the second exemplary embodiment of the present invention. Note that, regarding composite definition information, an element other than a property (FIG. 28) and a property element (FIG. 29) are shown separately, in order to avoid complexity.

Here, as shown in the state (a) of FIG. 28 and the state (a) of FIG. 29, the modification processing of composite definition information is described for the case where a component C-P_O in the composite P is relocated to a lower level composite C. Note that, it is assumed that, in the relocation source composite P, a service S-O and a reference R-O of the component C-P_O were connected with a service S-P and a reference R-P of the composite P, respectively.

In FIG. 28 and FIG. 29, an element shown with a dotted line is an element added in the complement processing. For example, a service S1-C, a reference R1-C, and a property P2-C are the elements complemented in the relocation of the component C-P_O.

Further, the composite C includes other component C-C_O2, and an instance of a service S-O2 of the component C-C_O2 and an instance of a reference R-O2 are connected with a service S2-C and a reference R2-C of the composite C, respectively. In the composite P, an instance of the service S2-C and an instance of the reference R2-C are connected with the service S-P and the reference R-P of the composite P, respectively. In the composite C, an instance of the property P-O2 of a composite O2 is referring to a property P1-C of the composite C. In the composite P, an instance of the property P1-C of the composite C is referring to a property P-P of the composite P.

The modification unit 121 determines whether there is a service (a service X6) whose connection source of the instance in the relocation source composite is the same as that of an added source (a service X5) in complementation, in the definition information of the relocation destination composite (Step S2201). When there is such a service X6 (Step S2201/EXIST), the modification unit 121 deletes the service X5 from the definition information of the relocation destination composite, and deletes the instance of the service X5 and a wiring connected with the instance of the service X5 from the definition information of the relocation source composite (Step S2202). The modification unit 121 changes the connection source of the wiring connected with the service X5 into the service X6, in the relocation destination composite (Step S2203), and proceeds to Step S2204. When there is no such a service X6 (Step S2201/NOT EXIST), the modification unit 121 proceeds to Step S2204.

For example, in the state (a) of FIG. 28, the connection source (service S-P) of the instance of the service S1-C (corresponding to the service X5) in the relocation source composite P is the same as the connection source of the instance of the service S2-C (corresponding to the service X6). Therefore, the modification unit 121 deletes the service S1-C in the relocation destination composite C. The modification unit 121 deletes the instance of the service S1-C and the wiring connected therewith from the relocation source composite P. The modification unit 121 changes the connection source of the wiring connected with the service S1-C into the service S2-C, in the relocation destination composite C.

Next, the modification unit 121 determines whether there is a reference (a reference X8) whose connection destination of the instance in the relocation source composite is the same as that of an added reference (a reference X7) in complementation, in the definition information of the relocation destination composite (Step S2204). When there is such a reference X8 (Step S2204/EXIST), the modification unit 121 deletes the reference X7 from the definition information of the relocation destination composite, and deletes the instance of the reference X7 and a wiring connected with the instance of the reference X7, from definition information of the relocation source composite (Step S2205). The modification unit 121 changes the connection destination of the wiring connected with the reference X7 into the reference X8, in the relocation destination composite (Step S2206), and proceeds to Step S2207. When there is no such a reference X8 (Step S2204/NOT EXIST), the modification unit 121 proceeds to Step S2207.

For example, in the state (a) of FIG. 28, the connection destination (reference R-P) of the instance of the reference R1-C (corresponding to the reference X7) in the relocation source composite P is the same as the connection destination of the instance of the reference R2-C (corresponding to the reference X8). Therefore, the modification unit 121 deletes the reference R1-C from the relocation destination composite C. The modification unit 121 deletes the instance of the reference R1-C and the wiring connected therewith from the relocation source composite P. The modification unit 121 changes the connection destination of the wiring connected with the reference R1-C into the reference R2-C, in the relocation destination composite C.

Next, the modification unit 121 determines whether there is a property (a property X10) whose reference destination of the instance in the relocation source composite is the same as that of an added property (a property X9) in complementation, in the definition information of the relocation destination composite (Step S2207). When there is such a property X10 (Step S2207/EXIST), the modification unit 121 deletes the property X9 in the definition information of the relocation destination composite, and deletes the instance of the property X9, from the definition information of the relocation source composite (Step S2208). The modification unit 121 changes the reference destination of the instance of the properties referring to the property X9 into the property X10, in the relocation destination composite (Step S2209), and ends the modification processing. When there is no such a property X10 (Step S2207/NOT EXIST), the modification unit 121 ends the modification processing.

For example, in the state (a) of FIG. 29, the reference destination (property P-P) of the instance of the property P2-C (corresponding to the property X9) in the relocation source composite P is the same as the reference destination of the instance of the property P1-C (corresponding to the property X10). Therefore, the modification unit 121 deletes the property P2-C from the relocation destination composite C. The modification unit 121 changes the reference destination of the instance of the property P-O referring to the property P2-C to the property P1-C, from the relocation destination composite C.

The states of the relocation source and destination composites, as the result of this, are shown as the state (b) of FIG. 28 and the state (b) of FIG. 29.

Note that, when an element added in complementation is deleted in Steps S2003 and S2004, the modification unit 121 also deletes the element from the complement information stored in the complement information storage unit 122.

Thus, the operation of the refactoring device 100 according to the second exemplary embodiment of the present invention is completed.

According to the second exemplary embodiment of the present invention, in the method of obtaining a system by combining program components, a composite after relocation of the program components can be modified to a composite that is simple and has a high maintainability. The reason is that the complement processing unit 112 deletes a redundant element and a useless dependency remaining in the relocation source composite, caused by complement processing.

Third Exemplary Embodiment

Next, a third exemplary embodiment of the present invention will be described.

The third exemplary embodiment of the present invention is different from the first exemplary embodiment of the present invention in a point of performing encapsulation processing for encapsulating a composite and performing expand processing for expanding an encapsulated component. Note that, in the third exemplary embodiment of the present invention, the reference signs as the first exemplary embodiment of the present invention are used for the same units as the first exemplary embodiment of the present invention, and a detailed description thereof is omitted.

Here, the encapsulation processing and the expand processing according to the third exemplary embodiment of the present invention will be described. FIG. 31 is a diagram showing an example of composite definition information regarding the encapsulation processing and the expand processing according to the third exemplary embodiment of the present invention.

The composite encapsulation is an operation that generates a new composite of the same definition information as an encapsulation target composite and replaces all components in the encapsulation target composite with a component using the generated composite as an implement element.

The composite encapsulation is used, for example, in order to prevent influence of relocation to composite definition information of an upper level composite when a component included in definition information of a composite needs to be extracted from the composite by the relocation.

For example, when a composite C includes a component C-C_O as shown in the state (a) of FIG. 31, and the component C-C_O needs to be extracted from the composite C by relocation, encapsulation processing is performed using the composite C as an encapsulation target composite. In this case, as shown in the state (b) of FIG. 31, a composite CI of the same definition information as the composite C is generated, and the component C-C_O in the composite C is replaced with the component C-C_CI using the generated composite CI as an implement element. Then, by relocating the component C-C_O of the composite CI to the upper level composite C of the composite CI, the definition information of the composite CI, from which the component C-C_O is extracted, is obtained without influencing on the upper level composite of the composite C.

The component expanding is an operation that replaces an expand target component with components included in a composite that is an implement element of the component.

The component expanding is used, for example, in order to delete a redundant composite layer caused by relocation of a component, or in order to restore a state of an encapsulated composite to a state before the encapsulation.

For example, when a composite CI is a redundant layer as shown in the state (b) of FIG. 31 as the result of relocation of a component C-C_O from a composite C to the composite CI, the expand processing is performed using a component C-C_CI as an expand target component. In this case, as shown in the state (a) of FIG. 31, the component C-C_CI is replaced with the component C-C_O included in the composite CI.

Figure 30:
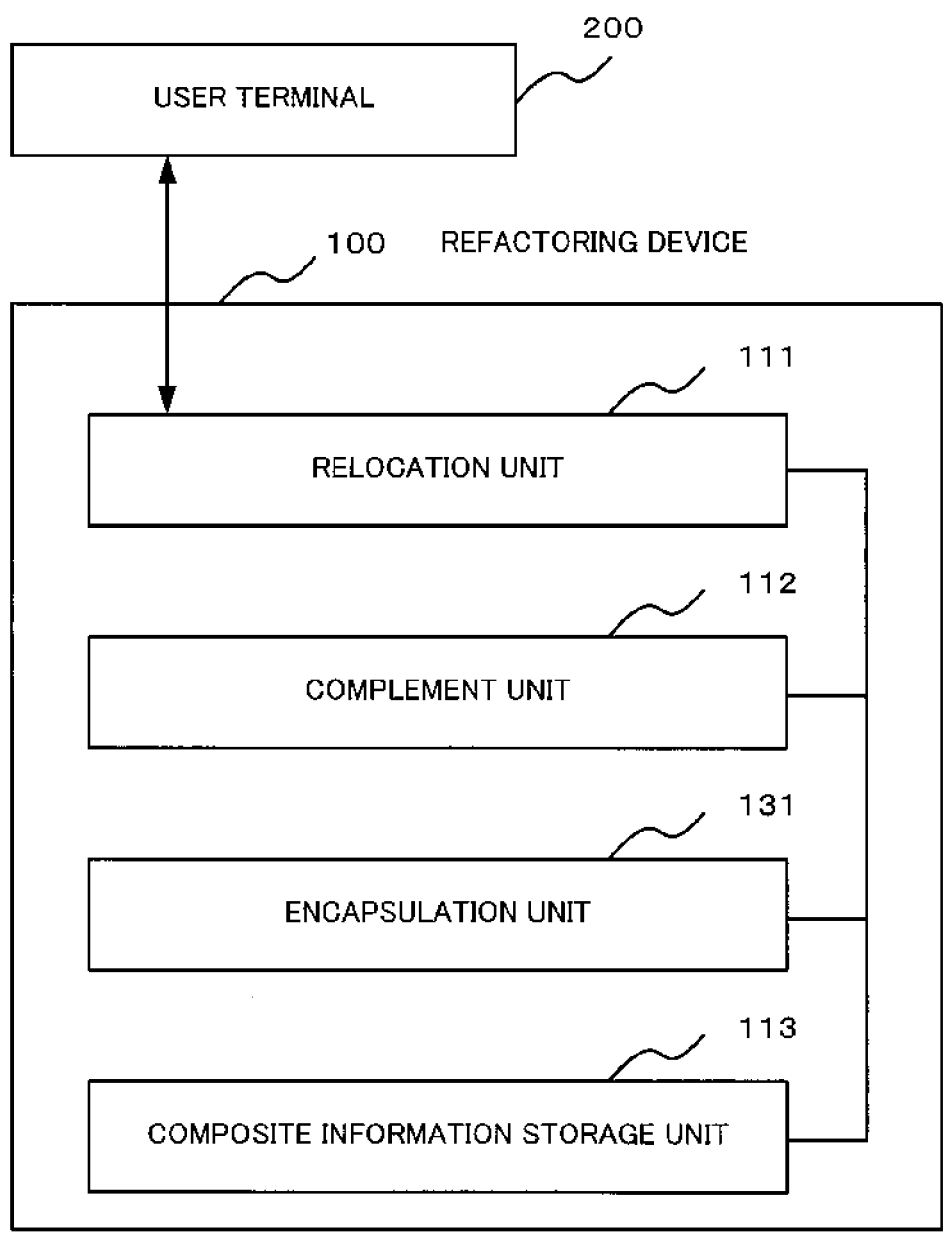
FIG. 30 A block diagram showing a configuration of a refactoring system to which a refactoring device 100 according to a third exemplary embodiment of the present invention is applied.

Next, a configuration of the third exemplary embodiment of the present invention will be described. FIG. 30 is a block diagram showing a configuration of a refactoring system to which a refactoring device 100 according to the third exemplary embodiment of the present invention is applied.

Referring to FIG. 30, the refactoring device 100 according to the third exemplary embodiment of the present invention includes an encapsulation unit 131 in addition to the configuration of the refactoring device 100 according to the first exemplary embodiment of the present invention.

When a relocation unit 111 receives an encapsulation request or an expand request from the user terminal 200, an encapsulation unit 131 performs encapsulation processing or expand processing.

The encapsulation request includes a name of an encapsulation target composite in addition to information indicating a request of composite encapsulation. For example, a character string of "capsule C" or the like may be used for the encapsulation request.

The expand request includes the name of the expand target component and a name of a composite including the component in addition to information indicating a request of component expanding. For example, a character string of "expand P C-P_C" or the like may be used for the expand request.

Next, an operation of the refactoring device 100 according to the third exemplary embodiment of the present invention will be described.

<Encapsulation Processing>

Figure 32:
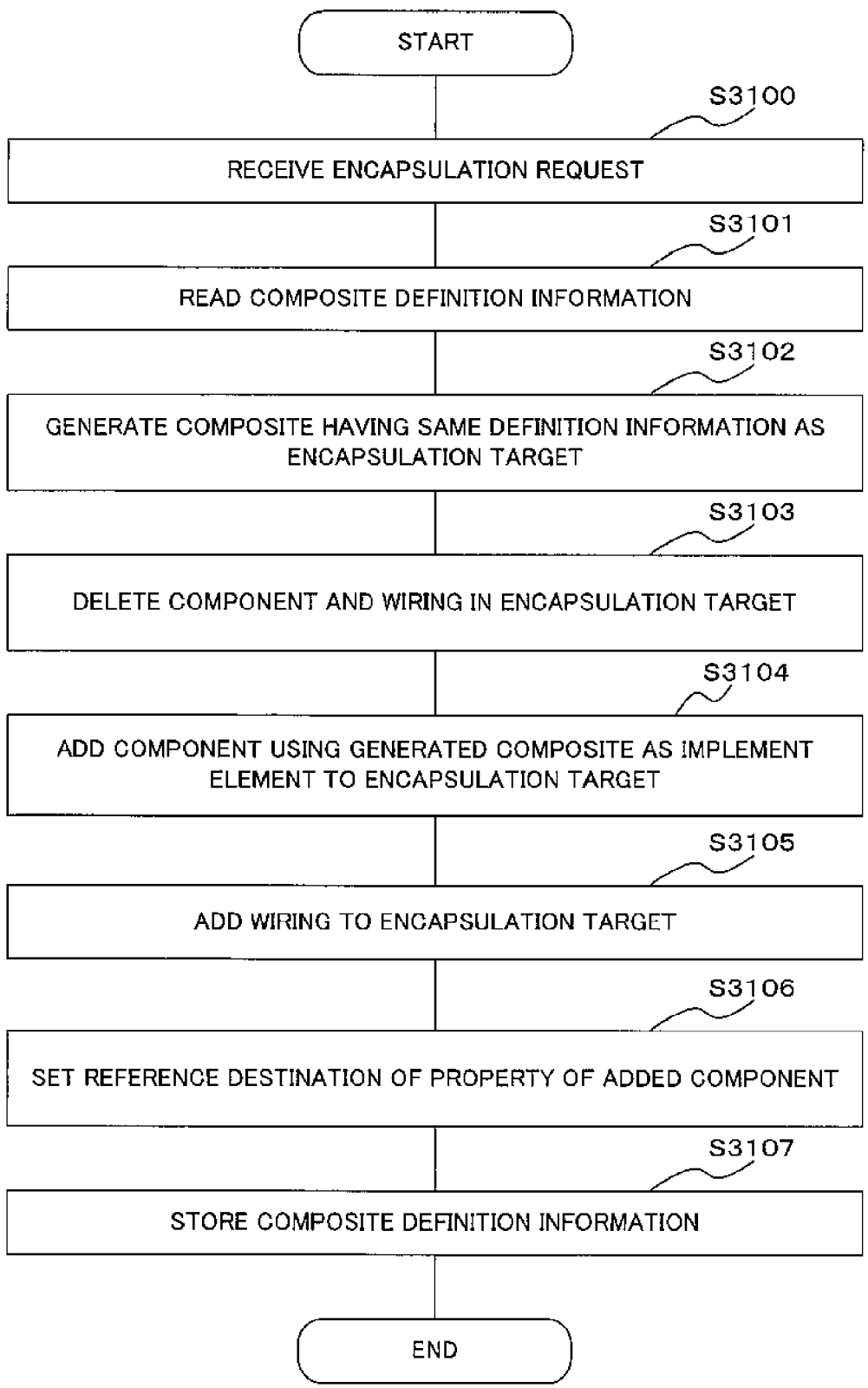
FIG. 32 A flow chart showing encapsulation processing according to the third exemplary embodiment of the present invention.

First, the encapsulation processing according to the third exemplary embodiment of the present invention will be described. FIG. 32 is a flow chart showing the encapsulation processing according to the third exemplary embodiment of the present invention.

Here, the encapsulation processing will be described in the case where a composite C is an encapsulation target composite, in the state (a) of the FIG. 31.

When the relocation unit 111 receives an encapsulation request of a composite (Step S3100), the encapsulation unit 131 reads definition information of the encapsulation target composite stored in the composite information storage unit 113 (Step S3101). The encapsulation unit 131 generates a composite of the different name having the same definition information as the encapsulation target composite and stores it in the composite information storage unit 113 (Step S3102).

The encapsulation unit 131 deletes all composites and wirings, from the definition information of the encapsulation target composite (Step S3103). The encapsulation unit 131 adds a component using the generated composite of the different name as an implement element into the definition information of the encapsulation target composite (Step S3104). The encapsulation unit 131 adds wirings connecting the services and references with services and references of the same name of the added component, respectively, into the definition information of the encapsulation target composite (Step S3105). The encapsulation unit 131 sets properties of the same name of the encapsulation target composite into reference destinations of instances of properties in the added composite, respectively, in the definition information of the encapsulation target composite (Step S3106). The encapsulation unit 131 stores the definition information of the encapsulation target composite in the composite information storage unit 113 (Step S3107).

For example, in the state (a) of FIG. 31, the encapsulation unit 131 generates a composite CI having the same definition information as the composite C and deletes a component C-C_O from the composite C. The encapsulation unit 131 adds a component C-C_CI using the generated composite CI as an implement element into the composite C. The encapsulation unit 131 adds a wiring connecting a service S-C with an instance of a service S-C of the component C-C_CI, and a wiring connecting a reference R-C with an instance of a reference R-C of the component C-C_CI. The encapsulation unit 131 sets a property P-C of the composite C into a reference destination of an instance of a property P-C of the component C-C_CI.

The states of the relocation source and destination composites, as the result of this, are shown as the state (b) of FIG. 31.

<Expand Processing>

Figure 33:
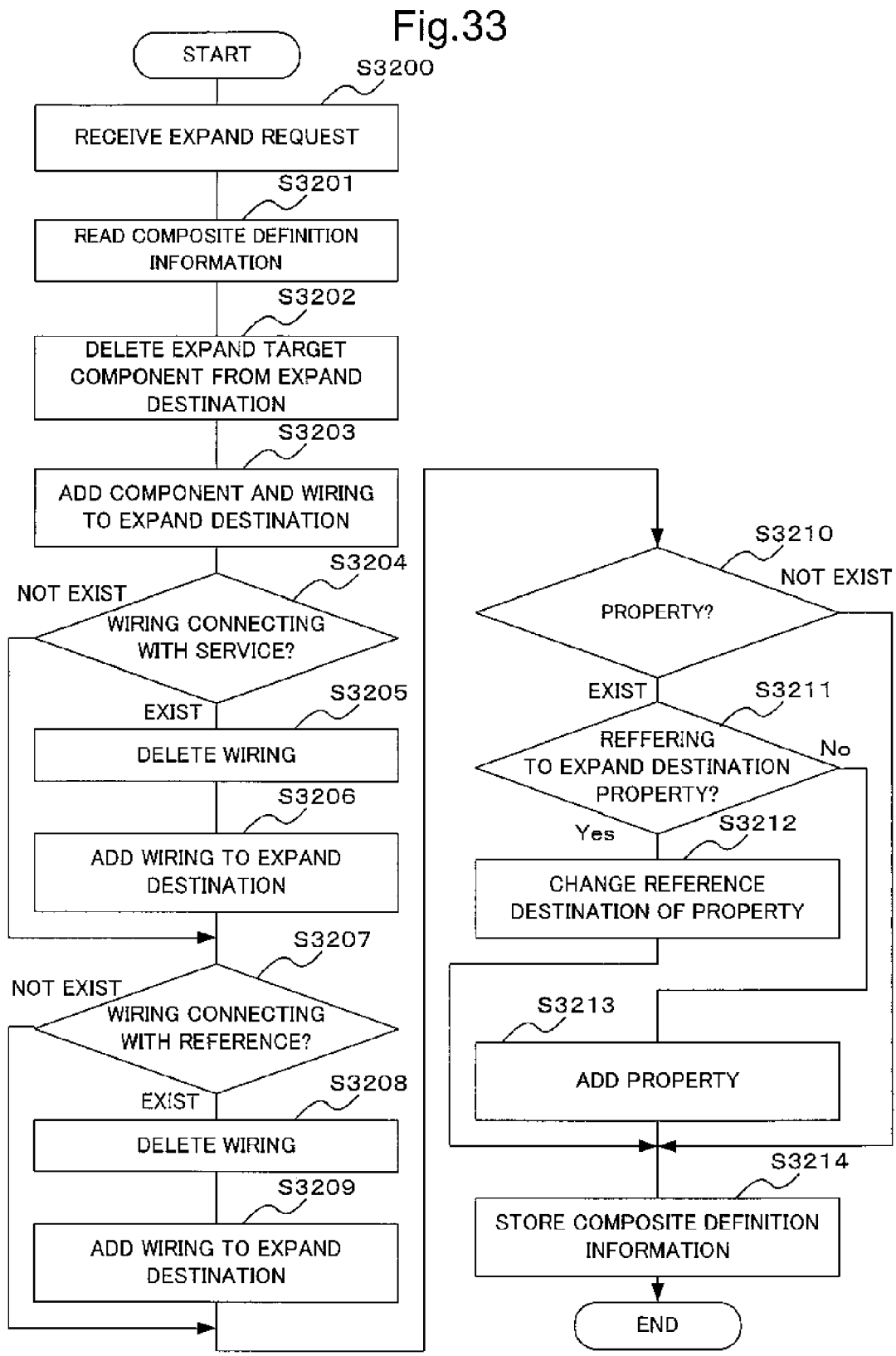
FIG. 33 A flow chart showing expand processing according to the third exemplary embodiment of the present invention.
Figure 35:
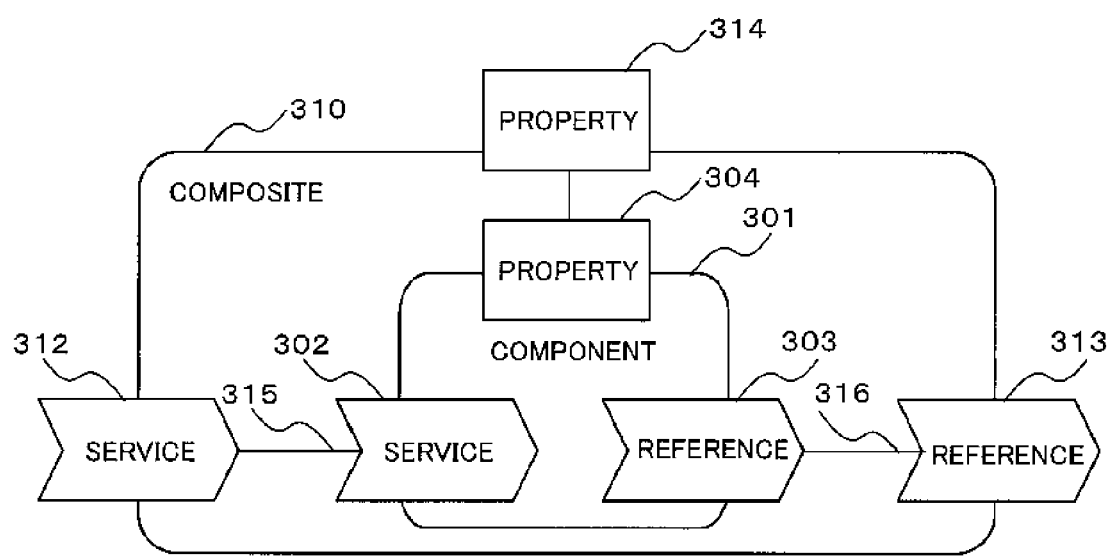
FIG. 35 A diagram showing elements defined in SCA.

Next, the expand processing according to the third exemplary embodiment of the present invention will be described. FIG. 33 is a flow chart showing the expand processing according to the third exemplary embodiment of the present invention. FIG. 34 is a diagram showing an example of composite definition information regarding the expand processing according to the third exemplary embodiment of the present invention.

Here, the expand processing will be described in the case where a component C-P_C in a composite P is an expand target component, in the state (a) of the FIG. 34.

When the relocation unit 111 receives an expand request of a component (Step S3200), the encapsulation unit 131 reads definition information of the composite (an expand target composite) which is an implement element of the expand target component and definition information of a composite (an expand destination composite) including the expand target component, stored in the composite information storage unit 113 (Step S3201). The encapsulation unit 131 deletes the expand target component, from the definition information on the expand destination composite (Step S3202). The encapsulation unit 131 adds components included in the expand target composite and wirings connecting services and references of the components, into the expand destination composite (Step S3203).

For example, as shown in the state (b) of FIG. 34, the component C-P_C is deleted from the composite P. A component C1-C_O and a component C2-C_O2 are added. A wiring connecting a reference R2-O and a service S-O2 is added.

Next, the encapsulation unit 131 determines whether there is a wiring whose connection destination is an instance of a service of the expand target composite, in the definition information of the expand destination composite (Step S3204). When there is such a wiring (Step S3204/EXIST), the encapsulation unit 131 deletes the wiring (Step S3205). The encapsulation unit 131 extracts an element connected to a service that is a connection destination of the deleted wiring, from the definition information of the expand target composite. The encapsulation unit 131 adds a wiring connecting the connection source of the deleted wiring and the instance of the extracted element into the definition information of the expand destination composite (Step S3206), and proceeds to Step S3207.

In Step S3204, when there is no such a wiring (Step S3204/NOT EXIST), the encapsulation unit 131 proceeds to Step S3207.

For example, in the state (b) of FIG. 34, a wiring connecting a service S-P and a service S-C in the composite P is deleted. A wiring connecting the service S-P and a service S-O is added.

Next, the encapsulation unit 131 determines whether there is a wiring whose connection source is an instance of a reference of the expand target composite, in the definition information of the expand destination composite (Step S3207). When there is such a wiring (Step S3207/EXIST), the encapsulation unit 131 deletes the wiring (Step S3208). The encapsulation unit 131 extracts an element connected to a reference that is a connection source of the deleted wiring, from the definition information of the expand target composite. The encapsulation unit 131 adds a wiring connecting the connection destination of the deleted wiring and the instance of the extracted element into the definition information of the expand destination composite (Step S3209), and proceeds to Step S3210.

In Step S3207, when there is no such a wiring (Step S3207/NOT EXIST), the encapsulation unit 131 proceeds s to Step S3210.

For example, in the state (b) of FIG. 34, a wiring connecting a reference R1-P and a reference R1-C and a wiring connecting a reference R2-P and a reference R2-C are deleted. A wiring connecting the reference R1-P and a reference R1-O and a wiring connecting the reference R2-P and a reference R-O2 are added.

Next, the encapsulation unit 131 determines whether there is a property (a property P1) in the definition information of the expand target composite (Step S3210). When there is the property P1 (Step S3210/EXIST), the encapsulation unit 131 determines, for each of all properties P1, whether an instance of the property P1 is referring to a property P2 of the expand destination composite, in definition information on the expand destination composite (Step S3211). When the property P1 is referring to the property P2 (Step S3211/YES), the encapsulation unit 131 changes the reference destination of all instances referring to the property P1 among instances of properties in the added component in Step S3203 into the property P2, in the definition information of the expand destination composite (Step S3212), and proceeds to Step S3214.

In Step S3211, when the property P1 is not referring to the property P2 (Step S3211/NO), the encapsulation unit 131 adds the property P1 into the expand destination composite (Step S3213), and proceeds to Step S3214.

In Step S3210, when there is not the property P1 (Step S3210/NOT EXIST), the encapsulation unit 131 proceeds to Step S3214.

For example, in the state (a) of FIG. 34, an instance of a property P-C of the component C-P_C is referring to a property P-P of the composite P. In the state (b) of FIG. 34, the reference destination of an instance of a property P-O in the component C1-C_O referring to the property P-C is changed into the property P-P.

There may be a case that, in the state (a) of FIG. 34, the instance of the property P-C in the component C-P_C is not referring to the property P-P of the composite P. In this case, in the state (b) of FIG. 34, the property P-C is added into the composite P, and the reference destination of the instance of the property P-O is kept to the property P-C.

The encapsulation unit 131 stores the definition information of the expand destination composite in the composite information storage unit 113 and ends the expand processing (Step S3214).

Thus, the operation of the refactoring device 100 according to the third exemplary embodiment of the present invention is completed.

According to the third exemplary embodiment of the present invention, even if an upper level composite of a refactoring target composite exists, refactoring can be performed without influencing on the definition information of the upper level composite. The reason is that the encapsulation unit 131 performs encapsulation of the refactoring target composite using a new composite having the same definition information as the refactoring target composite.

According to the third exemplary embodiment of the present invention, a redundant layer of a composite caused by relocation of a component can be deleted, and a state of an encapsulated composite is restored to a state before the encapsulation. The reason is that the encapsulation unit 131 expands an expand target component using a component of a composite which is an implement element of the expand target component.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the exemplary embodiment of the present invention, the configuration and the operation were described with the composite definition information as shown in FIG. 3 and FIG. 4. The similar effect is obtained when the present invention is applied to other development system using a program component defined by the similar elements to a component element, service element, a reference element, and a wiring element.

A part or the whole of the above-described exemplary embodiment can be described as, but not limited to, the following supplementary notes.

(Supplementary Note 1)

A refactoring device comprising:

a composite information storage means for storing a plurality of composites each including, as an element, a component which defines predetermined processing or a use of an instance of other composite, a service which defines a function provided, a reference which defines a function used, and a wiring which defines a function providing relation among a component, a service, and a reference;

a relocation means for moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and a complement means for performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

(Supplementary Note 2)

The refactoring device according to supplementary note 1, wherein when the relocation means has moved the target component included in the second composite with the first composite as a moving destination and the second composite as a moving source, in case a wiring whose connection destination is a service of the moved target component is detected in the second composite, the complement means adds a reference which is connectable to the detected wiring into the second composite, changes a connection destination of the detected wiring into the added reference, and adds a wiring whose connection source is the second reference and whose connection destination is the service of the moved target component into the first composite, and in case a wiring whose connection source is a reference of the moved target component is detected in the second composite, the complement means adds a service which is connectable to the detected wiring into the second composite, changes a connection source of the detected wiring into the added service, and adds a wiring whose connection destination is the added service and whose connection source is the reference of the moved target component into the first composite.

(Supplementary Note 3)

The refactoring device according to supplementary note 2, wherein the relocation means further moves at least one of a target service included in the second composite and a target reference included in the second composite with the first composite as a moving destination and the second composite as a moving source, when the relocation means has moved the target service, the complement means adds a service which is connectable to the moved target service into the second composite, changes a connection source of the wiring whose connection source was the moved target service into the added service in the second composite, and adds a wiring whose connection source is the moved target service and whose connection destination is the added service into the first composite, and when the relocation means has moved the target reference, the complement means adds a reference which is connectable to the moved target reference into the second composite, changes a connection destination of the wiring whose connection destination was the moved target reference into the added reference in the second composite, and adds a wiring whose connection source is the added reference and whose connection destination is the moved target reference into the first composite.

(Supplementary Note 4)

The refactoring device according to supplementary notes 2 or 3, further comprising a modification means, wherein, after the complement process performed by the complement means, in case a wiring whose connection source is a service connected with a reference of the moved target component and whose connection destination is a reference of the second composite is detected in the second composite, the modification means deletes the detected wiring and adds a wiring whose connection destination is the same as that of the wiring whose connection source is the reference of the second composite and whose connection source is the reference of the moved target component into the first composite, in case a wiring whose connection destination is a reference connected with a service of the moved target component and whose connection source is a service of the second composite is detected in the second composite, the modification means deletes the detected wiring and adds a wiring whose connection source is the same as that of the wiring whose connection destination is the service of the second composite and whose connection destination is the service of the moved target component into the first composite, and in case there is no wiring which connects a service or a reference of the second composite and other the element of the second composite in the second composite, the modification means deletes the service or the reference of the second composite and deletes the wiring which connects the service or the reference of the second composite and the element of the first composite from the first composite.

(Supplementary Note 5)

The refactoring device according to supplementary note 1, further comprising an encapsulation means, wherein, before the relocation means moves the target component included in the second composite with the first composite as a moving destination and the second composite as a moving source, the encapsulation means generates the second composite that is the same composite as the first composite, deletes a component included in the first composite, and sets a component which uses an instance of the second composite into the first composite.

(Supplementary Note 6)

The refactoring device according to supplementary note 1, wherein when the relocation means has moved the target component included in the first composite with the first composite as a moving source and the second composite as a moving destination, in case a wiring whose connection destination is a service of the moved target component is detected in the first composite, the complement means adds a service which is connectable to the detected wiring into the second composite, changes a connection destination of the detected wiring into the added service, and adds a wiring whose connection source is the added service and whose connection destination is the service of the moved target component into the second composite, and in case a wiring whose connection source is a reference of the moved target component is detected in the first composite, the complement means adds a reference which is connectable to the detected wiring into the second composite, changes a connection source of the detected wiring into the added reference, and adds a wiring whose connection destination is the added reference and whose connection source is the reference of the moved target component into the second composite.

(Supplementary Note 7)

The refactoring device according to supplementary note 6, further comprising a modification means, wherein after the complement process performed by the complement means, in case other service whose connection source in the first composite is the same as that of a service of the second composite is included in the second composite, the modification means deletes the service of the second composite and a wiring which connects the service of the second composite and the connection source from the first composite, and changes the connection source of a wiring whose connection source is the service of the second composite into the other service in the second composite, and in case other reference whose connection destination in the first composite is the same as that of a reference of the second composite is included in the second composite, the modification means deletes the reference of the second composite and a wiring which connects the reference of the second composite and the connection destination from the first composite, and changes the connection destination of a wiring whose connection destination is the reference of the second composite into the other service in the second composite.

(Supplementary Note 8)

The refactoring device according to supplementary note 1, further comprising an encapsulation means, wherein, after the relocation means moved the target component included in the first composite with the first composite as a moving source and the second composite as a moving destination, the encapsulation means deletes a component using an instance of the second composite included in the first composite, and sets a component included in the second composite into the first composite.

(Supplementary Note 9)

A refactoring method comprising:

storing a plurality of composites each including, as an element, a component which defines predetermined processing or a use of an instance of other composite, a service which defines a function provided, a reference which defines a function used, and a wiring which defines a function providing relation among a component, a service, and a reference;

moving a target component included in a second composite with a first composite as a moving destination and the second composite, the second composite used as an instance by a component included in the first composite, the first composite and the second composite being among the plurality of composites, or moving a target component included in the first composite with the first composite as a moving source and the second composite as a moving destination; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

(Supplementary Note 10)

A computer readable storage medium recording thereon a program, causing a computer to perform a method comprising:

storing a plurality of composites each including, as an element, a component which defines predetermined processing or a use of an instance of other composite, a service which defines a function provided, a reference which defines a function used, and a wiring which defines a function providing relation among a component, a service, and a reference;

moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite.

(Supplementary Note 11)

The refactoring device according to supplementary note 2, wherein each of the plurality of composites further includes, as the element, a property which defines a variable value usable by a component included in the composite, when the relocation means has moved the target component included in the second composite with the first composite as a moving destination and the second composite as a moving source, in case an instance of a property of the moved target component refers to a property of the second composite and an instance of the property of the second composite refers to a property of the first composite, the complement means changes a reference destination of the instance of the property of the moved target component into the property of the first composite, in case an instance of a property of the moved target component refers to a property of the second composite and an instance of the property of the second composite does not refer to a property of the first composite, the complement means adds a property of the same type as that of the property of the second composite into the first composite and changes reference destinations of the instance of the property of the moved target component and the instance of the property of the second composite into the added property of the first composite.

(Supplementary Note 12)

The refactoring device according to supplementary note 2 or 11, wherein each of the plurality of composites further includes, as the element, a property which defines a variable value usable by a component included in the composite, the relocation means further moves a target property included in the second composite with the first composite as a moving destination and the second composite as a moving source, when the relocation means has moved the target property, the complement means further adds a property of the same type as that of the property of the moved target property into the second composite, sets the moved target property in the first composite into a reference destination of an instance of the added property in the second composite, and changes a reference destination of an instance whose reference destination is the target property in the second composite into the added property in the second composite.

(Supplementary Note 13)

The refactoring device according to supplementary note 11 or 12, further comprising a modification means, wherein, after the complement process performed by the complement means, in case a property of the second composite is not referred from an instance of a property of a component included in the second composite, the modification means deletes the property of the second composite and an reference destination of the instance of the property of the second composite.

(Supplementary Note 14)

The refactoring device according to supplementary note 5, wherein, the encapsulation means generates the second composite that is the same composite as the first composite, deletes a component and a wiring included in the first composite, adds a component which uses an instance of the second composite into the first composite, and adds a wiring connecting a service of the first composite and a corresponding service of the added component and a wiring connecting a reference of the first composite and a corresponding reference of the added component.

(Supplementary Note 15)

The refactoring device according to supplementary note 6, wherein each of the plurality of composites further includes, as the element, a property which defines a variable value usable by a component included in the composite, when the relocation means has moved the target component included in the second composite with the first composite as a moving source and the second composite as a moving destination, in case an instance of a property of the moved target component refers to a property of the first composite, the complement means adds a property of the same type as that of the property of the moved target composite into the second composite, changes reference destinations of an instance of the property of the moved target component into the added property of the second composite, and sets the property of the first composite into a reference destination of an instance of the added property of the second composite.

(Supplementary Note 16)

The refactoring device according to supplementary note 15, further comprising a modification means, wherein, after the complement process performed by the complement means, in case there is other property whose reference destination of an instance is the same as that of the added property in the second composite, the modification means deletes the added property in the second composite, and changes a reference destination of an instance of a property referring to the added property in the second composite into the other property.

(Supplementary Note 17)

The refactoring device according to supplementary note 8, wherein, the encapsulation means deletes a component using an instance of the second composite included in the first composite, adds a component and a wiring included in the second composite, in case there is a wiring whose connection destination is a service of the deleted component in the first composite, the encapsulation means changes the connection destination of the wiring to a service of a component included in the second composite, the service is corresponding to the service of the deleted component, in case there is a wiring whose connection source is a reference of the deleted component in the first composite, the encapsulation means changes the connection source of the wiring to a reference of a component included in the second composite, the reference is corresponding to the reference of the deleted component.

This application is based upon and claims the benefit of priority from Japanese Patent Application No. 2011-033166, filed on Feb. 18, 2011, the disclosure of which is incorporated herein in its entirety by reference.

REFERENCE SIGNS LIST 100 refactoring device
111 relocation unit
112 complement unit
113 composite information storage unit
121 modification unit
122 complement information storage unit
131 encapsulation unit
200 user terminal
301 component
302 service
303 reference
304 property
310 composite
312 service
313 reference
314 property
315 wiring
316 wiring

What is claimed is:

1. A refactoring device comprising:

a composite information storage unit which stores in a memory a plurality of composites each including, as an element, a component which defines predetermined processing or a use of an instance of other composite, a service which defines a function provided by the composite, a reference which defines a function used by the composite, and a wiring which defines a function providing relation among the component, the service, and the reference;

a relocation unit stored in a memory which moves a target component included in a second composite with a first composite as a moving destination and the second composite as a moving source, the first composite and the second composite being among the plurality of composites, or moves a target component included in the first composite with the first composite as a moving source and the second composite as a moving destination, the second composite used as an instance by a component included in the first composite; and a complement unit which performs complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite, wherein when the relocation unit has moved the target component included in the second composite with the first composite as a moving destination and the second composite as a moving source, in case a wiring whose connection destination is a service of the moved target component is detected in the second composite, the complement unit adds a reference which is connectable to the detected wiring into the second composite, changes a connection destination of the detected wiring into the added reference, and adds a wiring whose connection source is the added reference and whose connection destination is the service of the moved target component into the first composite, and in case a wiring whose connection source is a reference of the moved target component is detected in the second composite, the complement unit adds a service which is connectable to the detected wiring into the second composite, changes a connection source of the detected wiring into the added service, and adds a wiring whose connection destination is the added service and whose connection source is the reference of the moved target component into the first composite.

2. The refactoring device according to claim 1, wherein the relocation unit further moves at least one of a target service included in the second composite and a target reference included in the second composite with the first composite as a moving destination and the second composite as a moving source, when the relocation unit has moved the target service, the complement unit adds a service which is connectable to the moved target service into the second composite, changes a connection source of the wiring whose connection source was the moved target service into the added service in the second composite, and adds a wiring whose connection source is the moved target service and whose connection destination is the added service into the first composite, and when the relocation unit has moved the target reference, the complement unit adds a reference which is connectable to the moved target reference into the second composite, changes a connection destination of the wiring whose connection destination was the moved target reference into the added reference in the second composite, and adds a wiring whose connection source is the added reference and whose connection destination is the moved target reference into the first composite.

3. The refactoring device according to claim 1, further comprising a modification unit, wherein, after the complement process performed by the complement unit, in case a wiring whose connection source is a service connected with a reference of the moved target component and whose connection destination is a reference of the second composite is detected in the second composite, the modification unit deletes the detected wiring and adds a wiring whose connection destination is the same as that of the wiring whose connection source is the reference of the second composite and whose connection source is the reference of the moved target component into the first composite, in case a wiring whose connection destination is a reference connected with a service of the moved target component and whose connection source is a service of the second composite is detected in the second composite, the modification unit deletes the detected wiring and adds a wiring whose connection source is the same as that of the wiring whose connection destination is the service of the second composite and whose connection destination is the service of the moved target component into the first composite, and in case there is no wiring which connects a service or a reference of the second composite and other the element of the second composite in the second composite, the modification unit deletes the service or the reference of the second composite and deletes the wiring which connects the service or the reference of the second composite and the element of the first composite from the first composite.

4. The refactoring device according to claim 1, further comprising an encapsulation unit, wherein, before the relocation unit moves the target component included in the second composite with the first composite as a moving destination and the second composite as a moving source, the encapsulation unit generates the second composite that is the same composite as the first composite, deletes a component included in the first composite, and sets a component which uses an instance of the second composite into the first composite.

5. The refactoring device according to claim 1, wherein when the relocation unit has moved the target component included in the first composite with the first composite as a moving source and the second composite as a moving destination, in case a wiring whose connection destination is a service of the moved target component is detected in the first composite, the complement unit adds a service which is connectable to the detected wiring into the second composite, changes a connection destination of the detected wiring into the added service, and adds a wiring whose connection source is the added service and whose connection destination is the service of the moved target component into the second composite, and in case a wiring whose connection source is a reference of the moved target component is detected in the first composite, the complement unit adds a reference which is connectable to the detected wiring into the second composite, changes a connection source of the detected wiring into the added reference, and adds a wiring whose connection destination is the added reference and whose connection source is the reference of the moved target component into the second composite.

6. The refactoring device according to claim 5, further comprising a modification unit, wherein, after the complement process performed by the complement unit, in case other service whose connection source in the first composite is the same as that of a service of the second composite is included in the second composite, the modification unit deletes the service of the second composite and a wiring which connects the service of the second composite and the connection source from the first composite, and changes the connection source of a wiring whose connection source is the service of the second composite into the other service in the second composite, and in case other reference whose connection destination in the first composite is the same as that of a reference of the second composite is included in the second composite, the modification unit deletes the reference of the second composite and a wiring which connects the reference of the second composite and the connection destination from the first composite, and changes the connection destination of a wiring whose connection destination is the reference of the second composite into the other reference in the second composite.

7. The refactoring device according to claim 1, further comprising an encapsulation unit, wherein, after the relocation unit moved the target component included in the first composite with the first composite as a moving source and the second composite as a moving destination, the encapsulation unit deletes a component using an instance of the second composite included in the first composite, and sets a component included in the second composite into the first composite.

8. A refactoring method executed by a processor comprising:

storing a plurality of composites each including, as an element, a component which defines predetermined processing or a use of an instance of other composite, a service which defines a function provided by the composite, a reference which defines a function used by the composite, and a wiring which defines a function providing relation among the component, the service, and the reference;

moving a target component included in a second composite with a first composite as a moving destination and the second composite as a moving source, the first composite and the second composite being among the plurality of composites, or moving a target component included in the first composite with the first composite as a moving source and the second composite as a moving destination, the second composite used as an instance by a component included in the first composite; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite, wherein when moving the target component included in the second composite with the first composite as a moving destination and the second composite as a moving source, in case a wiring whose connection destination is a service of the moved target component is detected in the second composite, adding a reference which is connectable to the detected wiring into the second composite, changing a connection destination of the detected wiring into the added reference, and adding a wiring whose connection source is the added reference and whose connection destination is the service of the moved target component into the first composite, and in case a wiring whose connection source is a reference of the moved target component is detected in the second composite, changing a connection source of the detected wiring into the added service, and adding a wiring whose connection destination is the added service and whose connection source is the reference of the moved target component into the first composite.

9. A non-transitory computer readable storage medium recording thereon a program, causing a computer to perform a method comprising:

storing a plurality of composites each including, as an element, a component which defines predetermined processing or a use of an instance of other composite, a service which defines a function provided by the composite, a reference which defines a function used by the composite, and a wiring which defines a function providing relation among the component, the service, and the reference;

moving a target component included in a second composite with a first composite as a moving destination and the second composite as a moving source, the first composite and the second composite being among the plurality of composites, or moving a target component included in the first composite with the first composite as a moving source and the second composite as a moving destination, the second composite used as an instance by a component included in the first composite; and performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite, wherein when moving the target component included in the second composite with the first composite as a moving destination and the second composite as a moving source, in case a wiring whose connection destination is a service of the moved target component is detected in the second composite, adding a reference which is connectable to the detected wiring into the second composite, changing a connection destination of the detected wiring into the added reference, and adding a wiring whose connection source is the added reference and whose connection destination is the service of the moved target component into the first composite, and in case a wiring whose connection source is a reference of the moved target component is detected in the second composite, changing a connection source of the detected wiring into the added service, and adding a wiring whose connection destination is the added service and whose connection source is the reference of the moved target component into the first composite.

10. A refactoring device comprising:

a composite information storage means for storing a plurality of composites each including, as an element, a component which defines predetermined processing or a use of an instance of other composite, a service which defines a function provided by the composite, a reference which defines a function used by the composite, and a wiring which defines a function providing relation among the component, the service, and the reference;

a relocation means for moving a target component included in a second composite with a first composite as a moving destination and the second composite as a moving source, the second composite used as an instance by a component included in the first composite, the first composite and the second composite being among the plurality of composites, or moving a target component included in the first composite with the first composite as a moving source and the second composite as a moving destination; and a complement means for performing complement process after moving the target component when there is a wiring between the element and the target component in the moving source, the complement process adding a service or a reference into the second composite, setting a wiring which connects the added service or reference and the element into the moving source composite, and setting a wiring which connects the added service or reference and the moved target component into the moving destination composite, wherein when the relocation means have moved the target component included in the second composite with the first composite as a moving destination and the second composite as a moving source, in case a wiring whose connection destination is a service of the moved target component is detected in the second composite, the complement means adds a reference which is connectable to the detected wiring into the second composite, changes a connection destination of the detected wiring into the added reference, and adds a wiring whose connection source is the added reference and whose connection destination is the service of the moved target component into the first composite, and in case a wiring whose connection source is a reference of the moved target component is detected in the second composite, the complement means adds a service which is connectable to the detected wiring into the second composite, changes a connection source of the detected wiring into the added service, and adds a wiring whose connection destination is the added service and whose connection source is the reference of the moved target component into the first composite.

* * * * *